(12) United States Patent
Witte et al.

(10) Patent No.: US 10,246,181 B2
(45) Date of Patent: Apr. 2, 2019

(54) METHOD FOR ATTACHING A SPLIT WINGLET TO A WING

(71) Applicant: The Boeing Company, Chicago, IL (US)

(72) Inventors: Philipp Witte, Renton, WA (US); Darrell D. Campbell, Jr., Vashon Island, WA (US); Billy P. Tung, Seattle, WA (US); Fedor Kleshchev, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/244,896

(22) Filed: Aug. 23, 2016

(65) Prior Publication Data

US 2016/0355254 A1 Dec. 8, 2016

Related U.S. Application Data

(62) Division of application No. 13/866,937, filed on Apr. 19, 2013, now Pat. No. 9,452,825.

(51) Int. Cl.
*B64F 5/10* (2017.01)
*B64C 23/06* (2006.01)

(52) U.S. Cl.
CPC .............. *B64C 23/069* (2017.05); *B64F 5/10* (2017.01); *Y02T 50/164* (2013.01);
(Continued)

(58) Field of Classification Search
CPC ........... B64C 23/065; B64C 3/58; B64C 3/10; B64C 7/00; B64C 27/463; B64C 39/024;
(Continued)

(56) References Cited

U.S. PATENT DOCUMENTS 2,846,165 A * 8/1958 Axelson .................... B64C 5/08
 244/90 R
4,247,063 A * 1/1981 Jenkins ..................... B64C 5/08
 244/91

(Continued)

FOREIGN PATENT DOCUMENTS

FR 2541231 8/1984
JP 2009-501678 1/2009
WO WO2007018785 2/2007

OTHER PUBLICATIONS

Korean Patent Office, Appl. No. 10-2014-40433, Office Action dated Aug. 30, 2018.
(Continued)

*Primary Examiner* — Joshua J Michener
*Assistant Examiner* — George Andonyan

(57) ABSTRACT

A method of securing a split winglet to a wing tip of an aircraft includes fastening an upper winglet to an upper winglet attachment portion of a wing attach fitting having a wing attachment portion. The method further includes fastening a lower winglet to a lower winglet attachment portion of the wing attach fitting. The method additionally includes fastening the wing attachment portion to the wing tip using tension fasteners installed from an inboard side of the wing tip to secure the split winglet to the wing.

20 Claims, 17 Drawing Sheets

(52) U.S. Cl.
CPC .... *Y10T 29/49817* (2015.01); *Y10T 29/49947* (2015.01); *Y10T 29/49963* (2015.01)

(58) Field of Classification Search
CPC ... B64C 5/08; B64C 1/0009; B64C 2039/105; B64C 2201/028; B64C 39/068; B64C 39/10; B64C 9/323; B64C 9/34; Y02T 50/164; Y02T 50/145
USPC .............................................. 244/131, 199.4
See application file for complete search history.

(56) References Cited

U.S. PATENT DOCUMENTS

| | | | | |
|---|---|---|---|---|
| 4,382,569 | A * | 5/1983 | Boppe | B64C 23/065 244/199.4 |
| 4,457,479 | A * | 7/1984 | Daude | B64C 5/08 244/203 |
| 4,722,499 | A * | 2/1988 | Klug | B64C 23/076 244/199.4 |
| 5,348,253 | A | 9/1994 | Gratzer | |
| 5,407,153 | A | 4/1995 | Kirk et al. | |
| 5,823,480 | A * | 10/1998 | La Roche | B64C 3/42 244/199.4 |
| 6,161,797 | A * | 12/2000 | Kirk | B64C 9/12 244/1 N |
| 6,345,790 | B1 * | 2/2002 | Brix | B64C 23/076 244/199.4 |
| 6,467,732 | B2 * | 10/2002 | Tsukahara | B64C 27/463 244/17.11 |
| 7,316,371 | B2 * | 1/2008 | Wyrembek | B64C 9/32 244/91 |
| 8,083,185 | B2 * | 12/2011 | Konings | B64C 3/385 244/199.4 |
| 8,382,041 | B1 * | 2/2013 | Yechout | B64C 23/069 244/199.4 |
| 8,544,800 | B2 * | 10/2013 | Stuhr | B64C 23/069 244/199.4 |
| 8,894,018 | B2 * | 11/2014 | Boer | B64C 23/072 244/199.4 |
| 2011/0260008 | A1 * | 10/2011 | Smith | F01D 5/145 244/199.4 |
| 2011/0315820 | A1 | 12/2011 | Andre | |
| 2012/0112005 | A1 | 5/2012 | Chaussee et al. | |
| 2012/0187251 | A1 * | 7/2012 | Guida | B64C 13/16 244/199.4 |
| 2012/0312928 | A1 | 12/2012 | Gratzer | |
| 2012/0312929 | A1 * | 12/2012 | Gratzer | B64C 23/069 244/199.4 |
| 2014/0346281 | A1 * | 11/2014 | Gratzer | B64C 23/069 244/199.4 |

OTHER PUBLICATIONS

Gulf Coast Patent Office, Appl. No. GC 2014-27006, Examination Report, dated Mar. 14, 2018.
Russian Patent Office, Appl. No. 2014115612/11(024466), Russian Office Action, dated Mar. 12, 2018.
JPO, Appl. No. 2014-084399, Japanese Office Action, dated Oct. 16, 2018.
JPO, Appl. No. 2014-084399, Japanese Office Action, dated Feb. 13, 2018.
U.S. Appl. No. 13/436,355, entitled Performance-Enhancing Winglet System and Method, filed Mar. 30, 2013.
Flightblogger, "Blended scimitar-tipped split winglet next on Aviation Partners' list," Oct. 17, 2011.
planetalkinglive.com,"Video: Airbus A320 Sharklet wing modifications added ready for flight test," retrieved Jan. 16, 2013. <http://www.planetalkinglive.com/video-airbus-a320-sharklet-wing-modifications-added-ready-for-flight-test/>.
EP 14160595, European Search Report, dated Aug. 22, 2014.
Appl. No. 201410151542.9, Chinese Office Action, dated Apr. 5, 2017.
Appl. No. 201410151542.9, Chinese Office Action, dated Sep. 27, 2017.

* cited by examiner

METHOD FOR ATTACHING A SPLIT WINGLET TO A WING

CROSS-REFERENCE TO RELATED APPLICATIONS

The present application is a divisional application of and claims priority to pending U.S. application Ser. No. 13/866,937 filed on Apr. 19, 2013, and entitled WINGLET ATTACH FITTING AND METHOD FOR ATTACHING A SPLIT WINGLET TO A WING, the entire contents of which is expressly incorporated by reference herein.

FIELD

The present disclosure relates generally to wing tip devices and, more particularly, to a winglet attach fitting for attaching a split winglet to an aircraft wing.

BACKGROUND

Winglets may be included on the wing tips of an aircraft to reduce aerodynamic drag generated by the aircraft wings as the wings move through the air. Winglets effectively increase the length of the trailing edge of the wings which spreads out the distribution of vortices that are shed by the trailing edge and the wing tips. The redistribution of vortices along the wing trailing edge may result in a significant reduction of induced aerodynamic drag which may improve the performance of the aircraft.

A winglet may be provided as a single winglet extending upwardly from a wing tip. A winglet may also be provided as a split winglet having an upper winglet and a lower winglet extending respectively upwardly and downwardly from the wing tip. A winglet must be coupled to the wing structure in a manner capable of resisting bending loads at the winglet-wing tip juncture.

Occasionally, it may be necessary to remove a winglet from an aircraft, and replace the winglet with a new winglet of the same or different configuration. For a split winglet, it may be desirable to remove and replace only the lower winglet, or it may be desirable to remove and replace only the upper winglet. Unfortunately, conventional means for attaching winglets may require a significant amount of time for installation, removal, and replacement. In addition, conventional means for installation, removal, and replacement of a winglet may entail complex operations that may require partial disassembly of the wing at the winglet-wing tip juncture in order to remove and reinstall a winglet.

As can be seen, there exists a need in the art for a system for attaching a winglet to a wing that allows for installation, removal, and replacement of the winglet in a reduced amount of time and without the need for partial disassembly of the wing.

SUMMARY

The above-noted needs associated with the attachment of a winglet to an aircraft wing are specifically addressed and alleviated by the present disclosure which provides a winglet attach fitting that may include a wing attachment portion, an upper winglet attachment portion, and a lower winglet attachment portion. The upper winglet attachment portion may be coupled to the wing attachment portion and may be configured to support an upper winglet. The lower winglet attachment portion may also be coupled to the wing attachment portion and may be configured to support a lower winglet. The wing attachment portion may be removably attachable to a wing tip using fasteners. The fasteners may comprise tension fasteners and may be installed from an inboard side of the wing tip.

Also disclosed is an aircraft having a wing including a wing tip and a wing skin. The aircraft may include a wing attach fitting having a wing attachment portion, an upper winglet attachment portion, and a lower winglet attachment portion. The wing attachment portion may be removably attached to the wing tip with tension fasteners installed through an access panel provided in the wing skin. The tension fasteners may extend through an inboard side of the wing tip and may be engaged to the wing attachment portion. The upper winglet attachment portion may be coupled to the wing attachment portion and may support an upper winglet. The lower winglet attachment portion may also be coupled to the wing attachment portion and may support a lower winglet.

Also disclosed is a method of securing a split winglet to a wing tip of an aircraft. The method may include fastening an upper winglet to an upper winglet attachment portion of a wing attach fitting having a wing attachment portion. The method may further include fastening a lower winglet to a lower winglet attachment portion of the wing attach fitting. The method may additionally include fastening the wing attachment portion to the wing tip using tension fasteners installed from an inboard side of the wing tip to secure the split winglet to the wing.

In a further embodiment, disclosed is a method of using a split winglet. The method may include providing an aircraft having a winglet attach fitting attaching a split winglet to a wing. The method may further include maintaining the winglet attach fitting at a first height relative to a fuselage when the aircraft is non-flying. The method may additionally include moving the winglet attach fitting to a second height relative to the fuselage when the aircraft is flying, and wherein the second height is higher than the first height.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
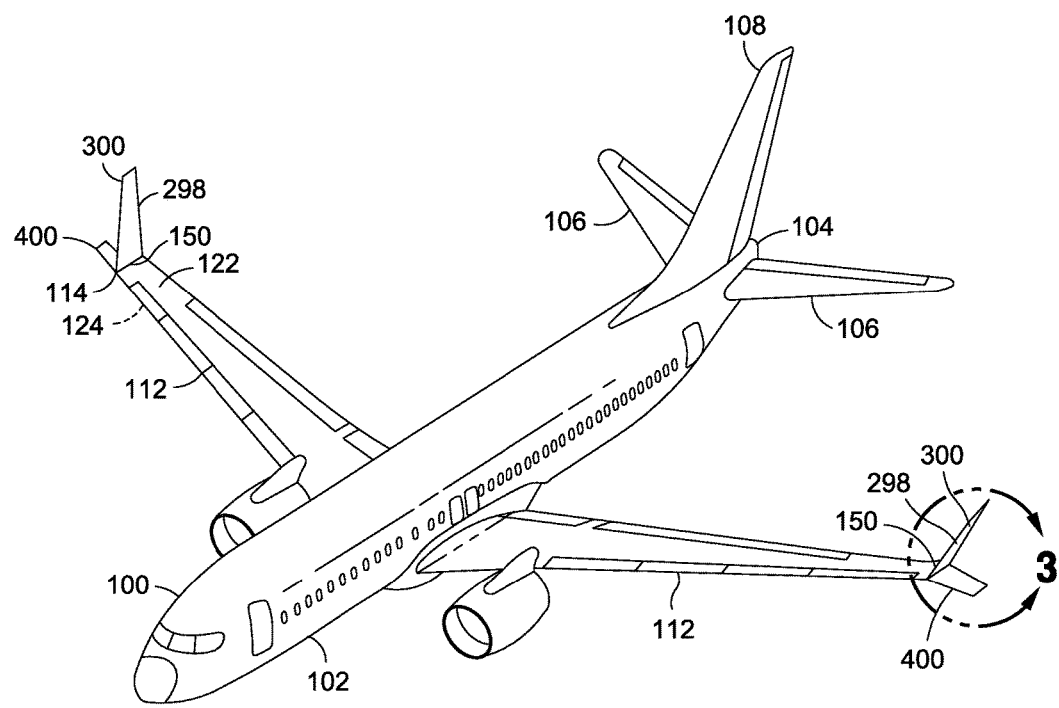
FIG. 1 is a perspective illustration of an aircraft having split winglets mounted on the wing tips of the wings.

Referring now to the drawings wherein the showings are for purposes of illustrating various embodiments of the present disclosure, shown in FIG. 1 is a perspective view of an aircraft 100 having a fuselage 102. The fuselage 102 may include a cabin for passengers and flight crew. The fuselage 102 extends from a nose at a forward end of the aircraft 100 to an empennage 104 at an aft end of the fuselage 102. The empennage 104 may include one or more tail surfaces such as a vertical tail 108 (e.g., a vertical fin) and/or a horizontal tail 106 (e.g., horizontal stabilizers) for directional control and stability of the aircraft 100. The aircraft 100 may further include a pair of wings 112 and one or more propulsion units. Each wing 112 may include a split winglet 298 mounted on a wing tip 114. Each one of the split winglets 298 may include an upper winglet 300 and a lower winglet 400. The split winglet 298 may be mounted to a wing tip 114 using a winglet attach fitting 150 as disclosed herein.

Advantageously, the winglet attach fitting 150 is configured to allow for relatively rapid installation and removal of the entire split winglet 298 using a limited number of fasteners such as tension fasteners 172 (FIG. 4) or other types of threaded fasteners, as described in greater detail below. However, the split winglet 298 may be attached to a wing tip 114 using fasteners that may not be loaded in tension. For example, in any one of the embodiments disclosed herein, the fasteners may comprise threaded fasteners loaded in shear (not shown) or fasteners loaded in a combination of shear and tension (not shown) for attaching the split winglet 298 to a wing tip 114. Furthermore, in any one of the embodiments disclosed herein, one or more mechanical features (not shown) may be incorporated into the winglet attach fitting 150 and/or into the wing tip 114 to facilitate the removable attachment of a split winglet 298 from the wing tip 114 such as from one side (e.g., an inboard side) of the wing tip 114 without the use of threaded fasteners.

In an embodiment, the split winglet 298 may be attached to a wing tip 114 using mechanical fasteners such as threaded fasteners and including tension fasteners 172 that may be installed from one side (e.g., an inboard side 134—FIG. 3) of the wing tip 114. For example, threaded fasteners such as tension fasteners 172 of other types of fasteners may be passed into a wing interior 132 on an inboard side 134 of a wing tip 114 to attach the split winglet 298 to the wing tip 114. In a further embodiment, the winglet attach fitting 150 may be secured to the wing tip 114 without the need for threaded fasteners. Furthermore, embodiments of the winglet attach fitting 150 advantageously provide a means for relatively rapid installation, removal, and/or replacement of the upper winglet 300 while the lower winglet 400 remains attached to the wing tip 114, or relatively rapid installation, removal, and/or replacement of the lower winglet 400 while the upper winglet 300 remains attached to the wing tip 114.

Although the winglet attach fitting 150 is described in the context of mounting a split winglet 298 to a fixed wing aircraft such as the tube-and-wing aircraft 100 illustrated in FIG. 1, the winglet attach fitting 150 may be used for mounting a split winglet 298 to any aircraft of any configuration, without limitation. For example, any one of the winglet attach fitting 150 embodiments disclosed herein may be used for mounting a split winglet 298 to civil, commercial, or military aircraft. In addition, any one of the winglet attach fitting 150 embodiments disclosed herein may be used for mounting a split winglet 298 to alternative aircraft configurations, and are not limited to the tube-and-wing aircraft 100 configuration illustrated in FIG. 1. For example, the winglet attach fitting 150 may be used for mounting a split winglet 298 to hybrid wing-body aircraft or to a blended-wing aircraft. In addition, any one of the winglet attach fitting 150 embodiments disclosed herein may be used for mounting a split winglet 298 to alternative types of aerodynamic surfaces including, but not limited to, a horizontal stabilizer, a canard, or any other type of aerodynamic surface.

Figure 2:
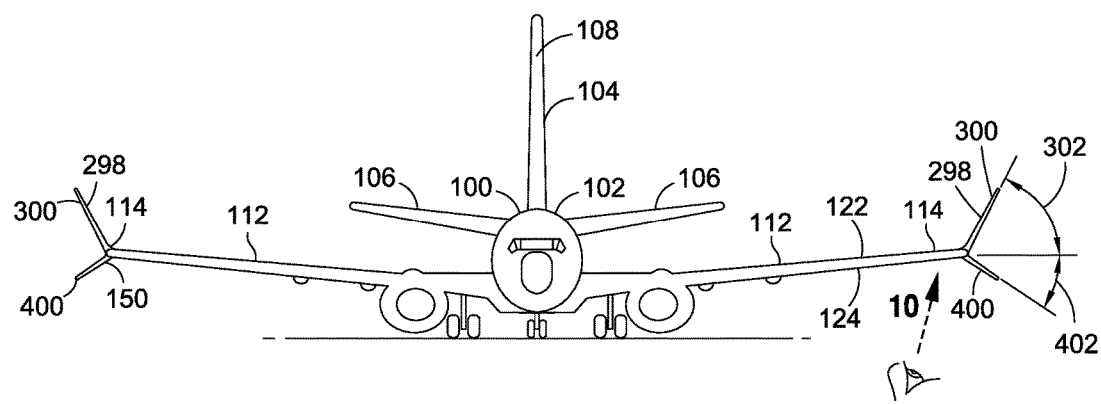
FIG. 2 is a front view of the aircraft of FIG. 1 illustrating the split winglet comprising an upper winglet oriented at a dihedral angle and a lower winglet oriented at an anhedral angle.

Referring to FIG. 2, the upper winglet 300 may have an upper winglet root 304 and an upper winglet tip 306. The upper winglet root 304 may be affixed to or fastened to the winglet attach fitting 150. The upper winglet 300 may extend upwardly from the wing 112 of the aircraft 100 and may be oriented at a dihedral angle 302 relative to horizontal. In an embodiment, the upper winglet 300 may be oriented at a dihedral angle 302 of at least approximately 60 degrees relative to horizontal when the wing 112 is under an approximate 1-g flight loading wherein the wing 112 may deflect upwardly. However, the upper winglet 300 may be oriented at a dihedral angle 302 of less than approximately 60 degrees relative to horizontal under an approximate 1-g flight loading. In an embodiment, the upper winglet 300 may be oriented at a dihedral angle 302 of from approximately 45 degrees to 80 degrees relative to horizontal. For example, the upper winglet 300 may be oriented at a dihedral angle 302 of approximately 60 degrees, plus or minus 5 degrees, relative to horizontal when the wing 112 is under an approximate 1-g flight loading.

In FIG. 2, the lower winglet 400 may have a lower winglet root 404 and a lower winglet tip 406. The lower winglet root 404 may be affixed or otherwise coupled to the winglet attach fitting 150. The lower winglet 400 may extend downwardly from the wing 112 of the aircraft 100 and may be oriented at an anhedral angle 402 relative to horizontal when the wing 112 is under an approximate 1-g flight loading wherein the wing 112 may deflect upwardly. In an embodiment, the lower winglet 400 may be oriented at an anhedral angle 402 of up to approximately 30 degrees or more. For example, in an embodiment, the lower winglet 400 may be oriented at an anhedral angle 402 of approximately 15 degrees, plus or minus 5 degrees, relative to horizontal when the wing 112 is under an approximate 1-g flight loading. However, the lower winglet 400 may be oriented at any anhedral angle 402. Although shown as relatively straight members extending from the winglet root 304, 404 to the winglet tip 306, 406, the upper winglet 300 and/or the lower winglet 400 may be provided in a non-straight shape and may include curved shapes or contoured shapes and may further include combinations of straight shapes, curved shapes, and contoured shapes.

Figure 3:
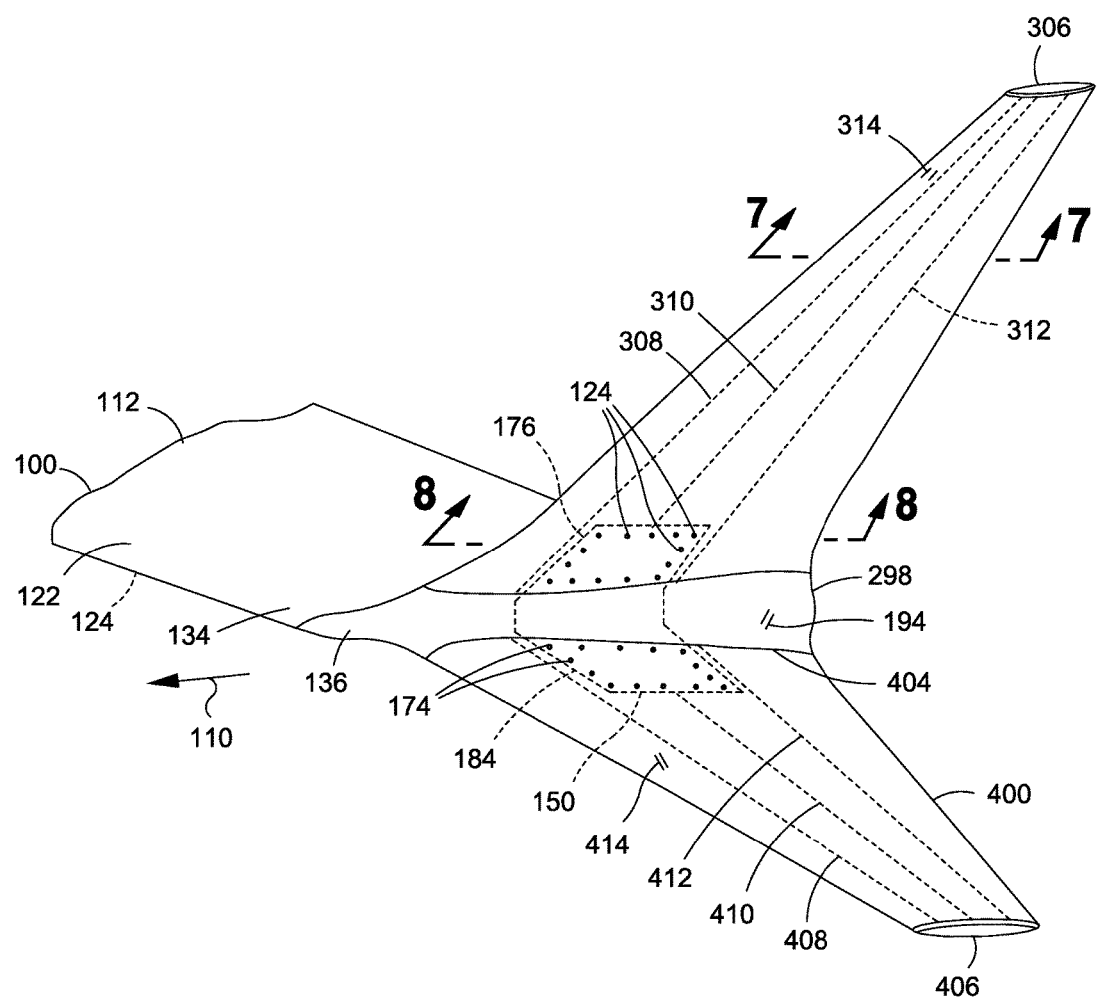
FIG. 3 is a perspective illustration of an embodiment of the split winglet taken along line 3 of FIG. 1 and illustrating the split winglet mounted to a wing tip.

Referring to FIG. 3, in an embodiment, the lower winglet root 404 may intersect or may be joined with the upper winglet root 304 (FIG. 4) at the winglet attach fitting 150. In an embodiment, the leading edge of the upper winglet 300 (FIG. 4) and/or the leading edge of the lower winglet 400 may intersect the wing tip 114 at a location that is approximately coincident with the wing leading edge, or at a location that is generally aft of the wing leading edge. Likewise, the trailing edge of the upper winglet 300 and/or the trailing edge of the lower winglet 400 may intersect the wing tip 114 at a location that is approximately coincident with the wing trailing edge, or at a location that is generally aft of the wing trailing edge.

In FIG. 3, in an embodiment, the split winglet 298 may be configured such that the upper winglet root chord and/or the lower winglet root chord may be approximately the same length as the wing tip chord. For example, in an embodiment, the upper winglet root chord and/or the lower winglet root chord may each have a length in the range of from approximately 60 to 100 or more percent of the length of the wing tip chord. In this regard, the split winglet 298 may be configured such that the upper winglet root chord and/or the lower winglet root chord may be longer or shorter than the wing tip chord.

Figure 4:
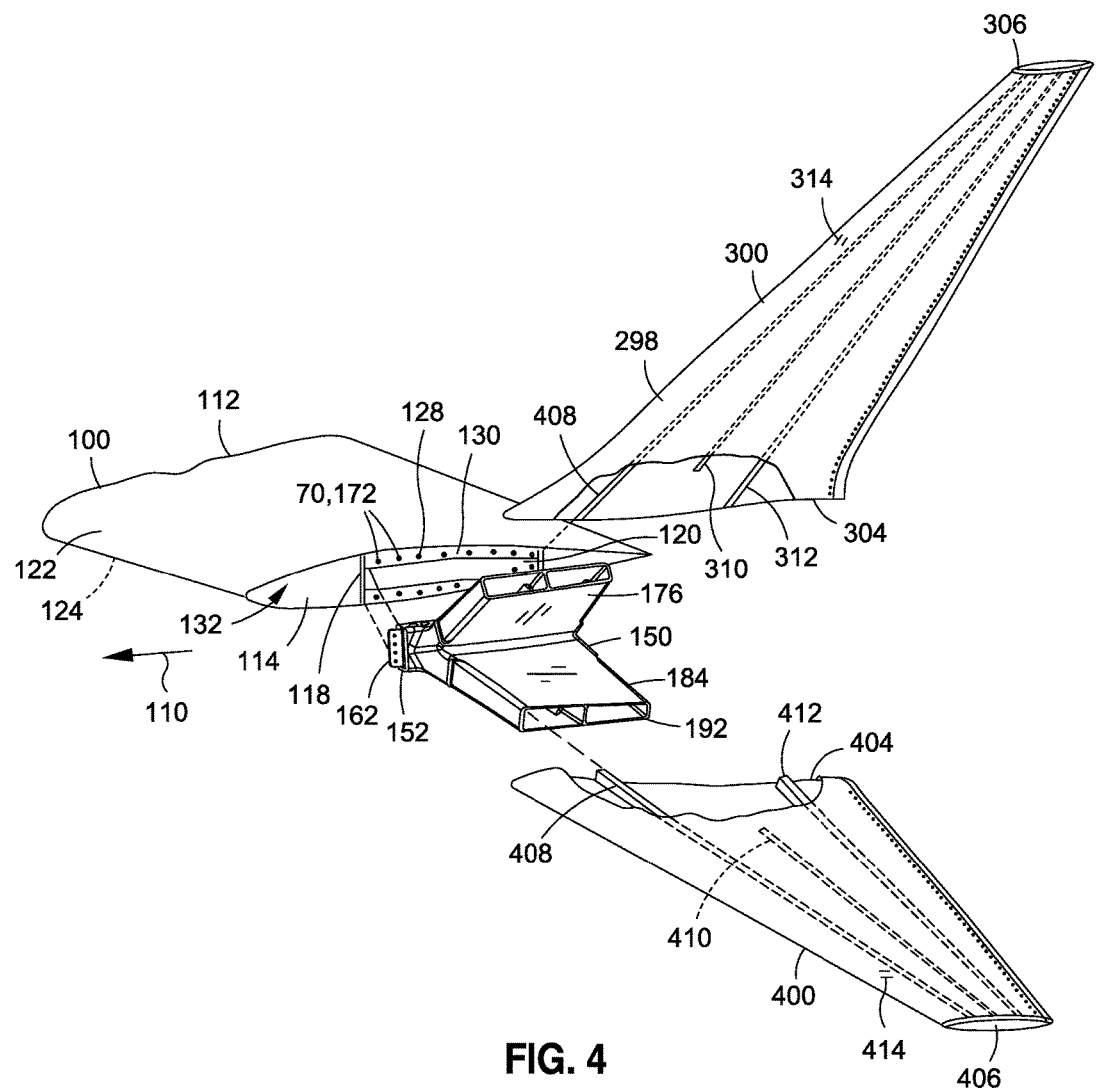
FIG. 4 is an exploded perspective illustration of the winglet of FIG. 3 and illustrating a winglet attach fitting for attaching an upper winglet and a lower winglet to the wing tip.

Referring to FIG. 4, shown is an exploded view of the split winglet 298 illustrating the interconnection of the upper winglet 300 and the lower winglet 400 to the wing tip 114 using the winglet attach fitting 150. In the embodiment shown, the winglet attach fitting 150 may be configured as a single-piece fitting which may be machined, cast, and/or otherwise formed as a unitary structure 192 and which may have a generally V-shaped cross section. The winglet attach fitting 150 includes a wing attachment portion 152 having a fitting root end 154 (FIG. 9) configured to be removably fastened to a wing tip 114. For example, the fitting root end 154 may be directly coupled to a wing tip rib 128.

In an embodiment, the wing attachment portion 152 may be disposed in abutting contact with the wing tip rib 128 and may be fastened thereto by means of tension fasteners 172 (FIG. 9) or other types of fasteners (e.g., shear fasteners). For example, fasteners may be extended through the wing tip rib 128 from an inboard side 134 (FIG. 3) thereof. The tension fasteners 172 or other types of fasteners may directly engage the winglet attach fitting 150. For example, tension fasteners 172 or other types of fasteners may be threadably engaged to a corresponding quantity of threaded bores (not shown) that may be formed in the winglet attach fitting 150. Fasteners such as tension fasteners 172 and/or shear fasteners 174 may also be installed from an outboard side of the wing tip 114 to attach the split winglet 298 to the wing tip 114. Fasteners may also be threadably engaged to threaded receptacles (not shown) such as may be mounted to the winglet attach fitting 150. In an embodiment shown in FIG. 9, tension fasteners 172 or other types of fasteners may be threadably engaged to a corresponding quantity of barrel nuts 168 (FIG. 5) that may be contained within or mounted within the barrel nut bores 166 (FIG. 5) formed in the fitting root end 154. In an embodiment, the fitting root end 154 may be integrally formed with the wing tip rib 128 in the manner similar to the winglet attach fitting 150 illustrated in FIGS. 20-21 and described below.

In FIG. 4, the wing 112 may include at least one wing spar 116 (FIG. 14) such as a forward wing spar 118 and/or an aft wing spar 120, and one or more intermediate wing spars (not shown). The wing spars 116 may terminate at the wing tip rib 128 which may comprise the outermost rib of the wing 112. In an embodiment, the upper wing skin 122 or lower wing skin 124 may include an access panel 126 (FIG. 10) to allow for insertion of the tension fasteners 172 into a wing interior 132 for installation of the tension fasteners 172 through the wing tip rib 128 and into threaded engagement with barrel nuts 168 that may be included with the wing attachment portion 152. The barrel nuts 168 and tension fasteners 172 advantageously allow for one-sided installation and removal of the winglet attach fitting 150 with the upper winglet 300 and lower winglet 400 attached thereto. In this manner, the winglet attach fitting 150 obviates the need to remove the upper winglet 300 or the lower winglet 400 from the winglet attach fitting 150 prior to removing the split winglet 298 from the wing tip 114.

In FIG. 4, the upper winglet attachment portion 176 and the lower winglet attachment portion 184 may be coupled to the wing attachment portion 152. The upper winglet attachment portion 176 and the lower winglet attachment portion 184 may extend from the outboard side 136 (e.g., the split winglet 298 side) of the wing attachment portion 152, and in opposing relation to the inboard side 134 (e.g., the wing tip 114 side) of the wing attachment portion 152. The upper winglet attachment portion 176 may extend in upwardly angled relation to the wing attachment portion 152. For example, the upper winglet attachment portion 176 may extend upwardly from the wing attachment portion 152 at an angle of at least approximately 60 degrees relative to horizontal. In an embodiment, the upper winglet attachment portion 176 may be oriented at an angle that may be complementary to the dihedral angle 302 (FIG. 2) of the upper winglet 300 which may be oriented at a dihedral angle 302 of at least approximately 60 degrees relative to horizontal during upward deflection of the wing 112 under an approximate 1-g flight loading.

The lower winglet attachment portion 184 may be oriented in downwardly angled relation to the wing attachment portion 152. For example, the lower winglet attachment portion 184 may extend downwardly at an angle of up to approximately 30 degrees or more relative to horizontal. The angled orientation of the lower winglet attachment portion 184 may be configured complementary to the angled orientation of the lower winglet 400 or the lower winglet attachment portion 184 may be aligned with the angled orientation of the lower winglet 400. In an embodiment, the lower winglet 400 may be oriented at an anhedral angle 402 (FIG. 2) of up to approximately 30 degrees or more when the wing 112 is under an approximate 1-g flight loading as mentioned above. However, the lower winglet attachment portion 184 may be oriented at a different angle than the lower winglet 400. In an embodiment, the wing attachment portion 152 may extend along a lengthwise (e.g., chordwise) direction of at least a portion of the length of the wing tip rib 128. The wing attachment portion 152 may have a generally vertically-oriented face on a fitting root end 154 (FIG. 5) for interfacing with a generally vertically-oriented face of the wing tip rib 128. However, the wing attachment portion 152 and the wing tip rib 128 may be provided with non-vertical faces for mating with one another.

In FIG. 4, in an embodiment, as indicated above, the upper winglet attachment portion 176 and the lower winglet attachment portion 184 may be integrally formed with the wing attachment portion 152 to form a unitary structure. The upper winglet attachment portion 176 may have a generally hollow, box-shaped terminal end 182 (FIG. 5) configured for stove-piping or slidable insertion of the upper winglet attachment portion 176 into the generally hollow interior of the upper winglet 300 at the upper winglet root 304 end. Likewise, the lower winglet attachment portion 184 may have a generally hollow, box-shaped terminal end 190 (FIG. 5) configured for stove-piping the lower winglet attachment portion 184 into the generally hollow interior of the lower winglet 400 at the lower winglet root 404 end. In an embodiment, the upper winglet 300 and/or the lower winglet 400 may include one or more winglet spars 310, 312, 314, 410, 412, 414 that may extend between the respective winglet skins 312, 412. For example, the upper winglet 300 may include an upper winglet forward spar 308, an upper winglet mid spar 310, and an upper winglet aft spar 312. Likewise, the lower winglet 400 may include a lower winglet forward spar 408, a lower winglet mid spar 410, and a lower winglet aft spar 412. However, the upper winglet 300 and/or the lower winglet 400 may include any number of spars, or the upper winglet 300 and/or the lower winglet 400 may be devoid of spars.

In FIG. 4, the upper winglet 300 and the lower winglet 400 may be attached to the respective upper winglet attachment portion 176 and lower winglet attachment portion 184 using at least one shear fastener 174 such as exteriorly-accessible shear fasteners 174. In an embodiment, the shear fasteners 174 may be extended through the respective upper winglet skin 314 and lower winglet skin 414. For example, the shear fasteners 174 may be threadably engaged into nutplates (not shown) or other threaded receptacles that may be mounted on the interior of the walls 178 of the terminal end 182 of the upper winglet attachment portion 176 and lower winglet attachment portion 184. The shear fasteners 174 may also be configured as non-threaded fasteners including, but not limited to, blind bolts, rivets, and any other type of non-threaded, one-sided fasteners. In an embodiment, the winglet attach fitting 150 may be configured to minimize or eliminate the need for internal access to the winglet attach fitting 150 for installing the tension fasteners 172 attaching the upper winglet 300 and lower winglet 400 to the respective upper winglet attachment portion 176 and lower winglet attachment portion 184. However, the upper and lower winglet attachment portion 176, 184 may be configured to be mechanically fastened to the upper and lower winglet forward spar 308, 408, mid spar 310, 410, and/or aft spar 312, 412 as described in greater detail below.

Figure 5:
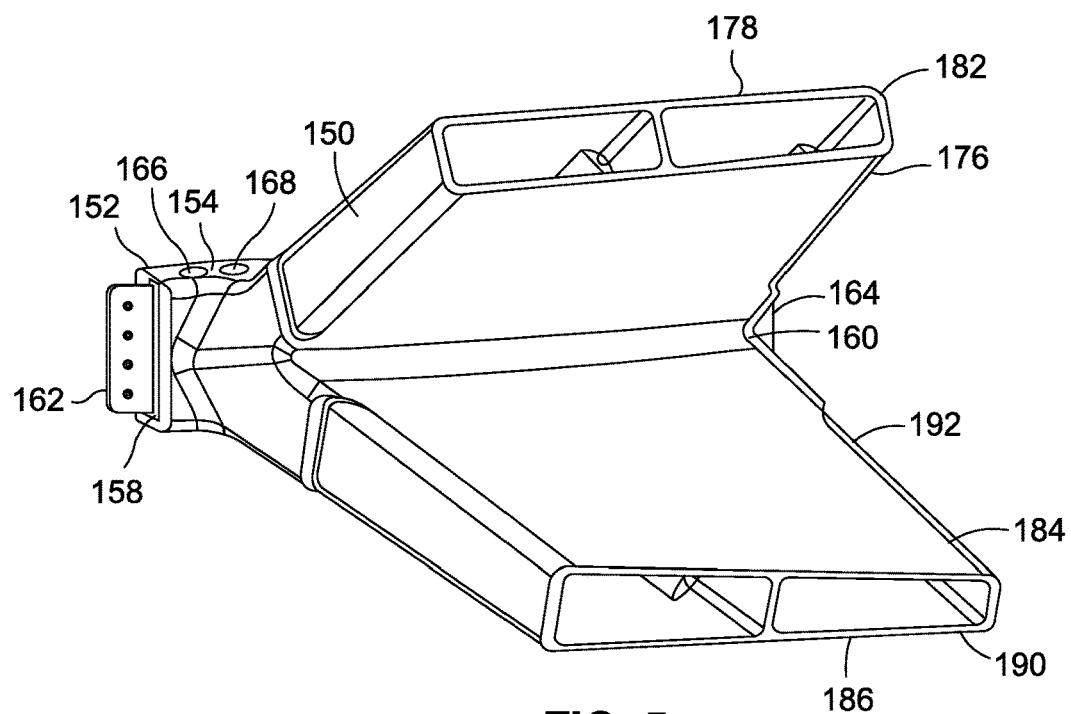
FIG. 5 is a perspective illustration of an embodiment of a winglet attach fitting configured as a single-piece, unitary structure and comprising a wing attachment portion, an upper winglet attachment portion, and a lower winglet attachment portion.

Referring to FIG. 5, shown is an embodiment of a winglet attach fitting 150 configured as a unitary structure 192 that may allow for installation and removal of the entire split winglet 298 in a reduced amount of time relative to conventional methods for attaching winglets. The upper winglet attachment portion 176 and the lower winglet attachment portion 184 may be joined together at the wing attachment portion 152 to form the unitary structure 192 winglet attach fitting 150. The upper winglet attachment portion 176 and the lower winglet attachment portion 184 may intersect one another at the wing attachment portion 152. In an embodiment not shown, the winglet attach fitting may be configured in an arrangement wherein the lower winglet attachment portion 184 is joined to the upper winglet attachment portion 176 and the upper winglet attachment portion 176 is, in turn, joined to the wing attachment portion 152. As indicated above, the upper winglet attachment portion 176 and the lower winglet attachment portion 184 may be configured to be insertable into the respective upper winglet 300 and lower winglet 400. The upper winglet attachment portion 176 and the lower winglet attachment portion 184 may be mechanically fastened to the respective upper winglet 300 and lower winglet 400 using shear fasteners 174 as indicated above.

Figure 6:
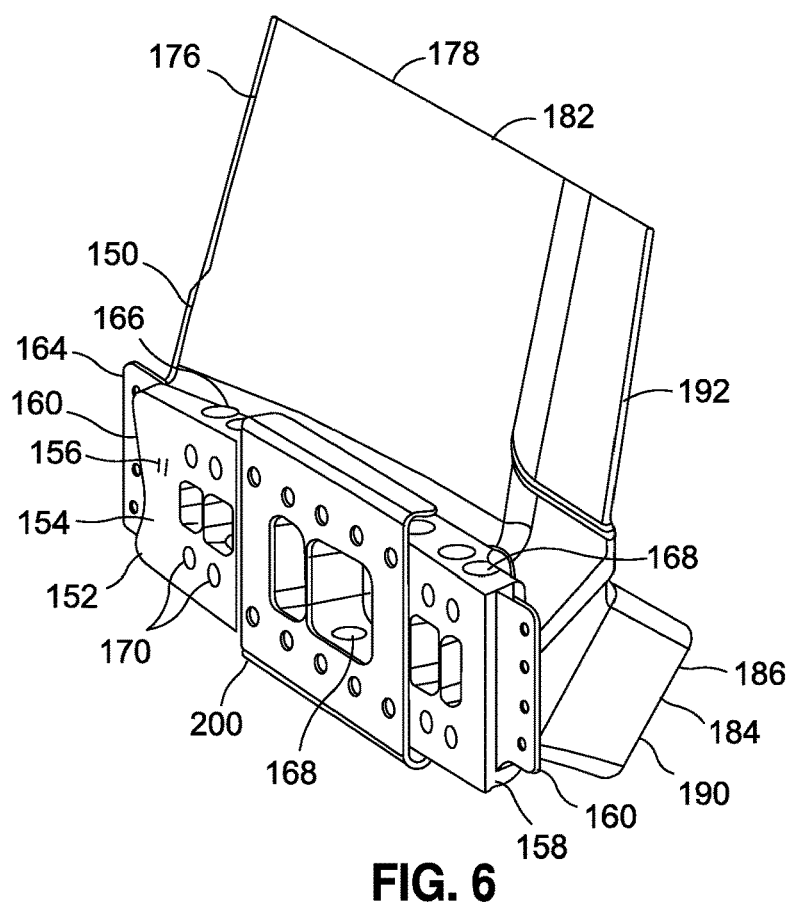
FIG. 6 is a further perspective illustration of the winglet of FIG. 5 and illustrating a fitting root end for attaching the winglet to a wing tip rib using a plurality of tension fasteners.

FIG. 6 illustrates a fitting root end 154 on an inboard side of the winglet attach fitting 150 of FIG. 5. The fitting root end 154 may be formed as a relatively thick block with a series of vertically-oriented barrel nut bores 166 for accommodating barrel nuts 168. Although the barrel nut bores 166 may be non-vertically oriented, a vertical orientation of the barrel nut bores 166 may facilitate removal and replacement of barrel nuts 168 from the winglet attach fitting 150. The fitting root end 154 may further include a corresponding series of horizontally-oriented fastener bores 170 that may be aligned with the barrel nut bores 166. The tension fasteners 172 (FIG. 4) may be extended through the fastener bores 170 in the wing tip rib 128 (FIG. 4) and the fitting root end 154 and threadably engaged to the barrel nuts 168 to attach the winglet attach fitting 150 to the wing tip rib 128.

However, other types of fasteners may be used to attach the winglet attach fitting 150 to the wing tip 128. For example, threaded fasteners such as tension fasteners or shear fasteners may be used to attach the winglet attach fitting 150 to the wing tip rib 128. In an embodiment, the tension fasteners 172 may be engaged to threaded receptacles (not shown) other than barrel nuts 168. For example, the tension fasteners 172 may be threadably engaged to threaded bores (not shown) that may be formed directly in the fitting root end 154 of the winglet attach fitting 150. Even further, the tension fasteners 172 may be threadably engaged to nut plates (not shown) that may be mounted on an outboard side 136 of the wing tip rib 128. However, one or more of the barrel nuts 168 may be removed and replaced in the event of damage to the barrel nut 168 and thereby avoid the need to replace the entire winglet attach fitting 150 if a threaded bore becomes damaged. Advantageously, the generally vertical orientation of the barrel nut bores 166 may allow for relatively rapid removal and replacement of one or more barrel nuts 168 from the winglet attach fitting 150.

In FIG. 6, in an embodiment, the winglet attach fitting 150 may include a forward tab 162 (FIG. 22) and/or an aft tab 164 extending from a respective forward face 158 and aft face 160 of the winglet attach fitting 150. The forward tab 162 and the aft tab 164 may facilitate the attachment of a relatively small leading edge rib (not shown) or trailing edge rib (not shown) to the winglet attach fitting 150. Such leading edge rib and or trailing edge rib may support one or more aerodynamic fairings (not shown) to provide an aerodynamically continuous surface between the leading edges and the trailing edges of the wing 112 (FIG. 4) and the split winglet 298 (FIG. 4).

Figure 7:
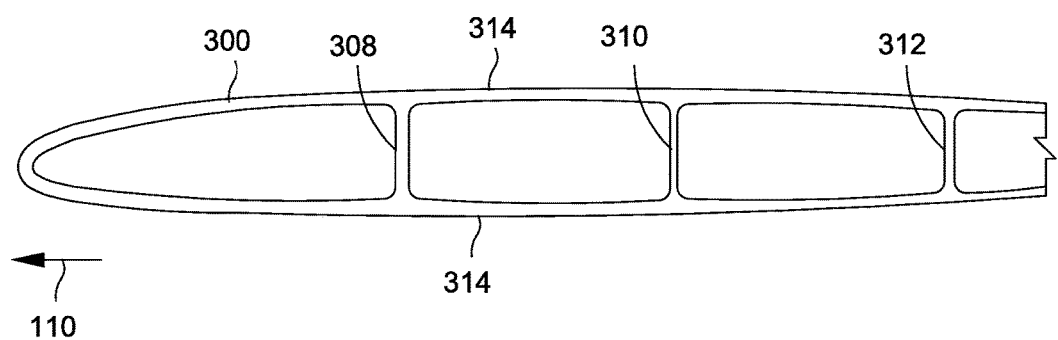
FIG. 7 is a cross-sectional illustration of a portion of an embodiment of an upper winglet taken along line 7 of FIG. 3 and having an upper winglet forward spar, an upper winglet mid spar, and an upper winglet aft spar.

FIG. 7 is a cross-section of a portion of the upper winglet 300 with the trailing edge of the upper winglet 300 omitted for clarity. As indicated above, the upper winglet 300 may include an upper winglet forward spar 308, an upper winglet mid spar 310, and an upper winglet aft spar 312 extending between opposing upper winglet skin 314s. However, the upper winglet 300 may be provided with any number of spars and is not limited to the configuration illustrated FIG. 7. As mentioned above, the upper winglet 300 attach portion may be configured to be mechanically fastened to the upper winglet skin 314 on opposite sides (i.e., inboard side and outboard side) of the upper winglet 300. In addition, the upper winglet attachment portion 176 may be configured to be mechanically fastened to the upper winglet forward spar 308, the upper winglet mid spar 310, and/or the upper winglet aft spar 312 as described below. The lower winglet 400 may be configured similar to the upper winglet 300 and may include a lower winglet forward spar 408 (FIG. 4), a lower winglet mid spar 410 (FIG. 4), and a lower winglet aft spar 412 (FIG. 4) to which the lower winglet attachment portion 184 (FIG. 4) may be fastened.

Figure 8:
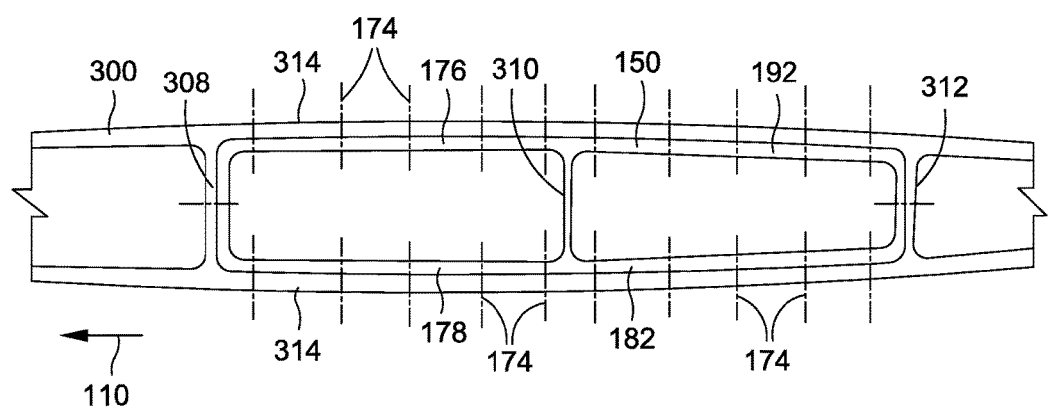
FIG. 8 is a cross-sectional illustration of the upper winglet taken along line 8 of FIG. 3 and illustrating the interconnection of the upper winglet attachment portion to the upper winglet using a plurality of shear fasteners.

FIG. 8 is a cross-section of the upper winglet 300 (FIG. 7) showing the interconnection of the upper winglet attachment portion 176 to the upper winglet 300. A plurality of shear fasteners 174 may be extended through the upper winglet skin 314 and the walls 178 of the upper winglet attachment portion 176. Although not shown, the shear fasteners 174 may engage nutplates or other threaded receptacles that may be mounted on an interior of the upper winglet attachment portion 176. As indicated above, the shear fasteners 174 may also be configured as non-threaded fasteners such as blind bolts, rivets, and other types of non-threaded, one-sided fasteners, without limitation. The upper winglet attachment portion 176 may optionally include one or more ribs to provide increased structural support and stiffness to the upper winglet attachment portion 176. The outer surfaces of the upper winglet attachment portion 176 may be sized and configured to engage the inner surfaces of the upper winglet skin 314 with minimal or no shimming.

In an embodiment, the upper winglet attachment portion 176 (FIG. 8) may be configured to nest against the inner surfaces of the upper winglet forward spar 308 and upper winglet aft spar 312 (FIG. 8). One or more mechanical fasteners may be extended through the upper winglet forward spar 308 and/or the upper winglet aft spar 312 and into the walls 178 of the upper winglet attachment portion 176 and may threadably engage nutplates (not shown) or other threaded receptacles or non-threaded fasteners (e.g., one-sided fasteners) may be used to attach the upper winglet forward spar 308 and/or the upper winglet aft spar 312 to the walls 178 of the upper winglet attachment portion 176. The lower winglet 400 (FIG. 4) may be fastened to the lower winglet attachment portion 184 (FIG. 6) in a manner similar to the fastening of the upper winglet 300 to the upper winglet attachment portion 176.

Figure 9:
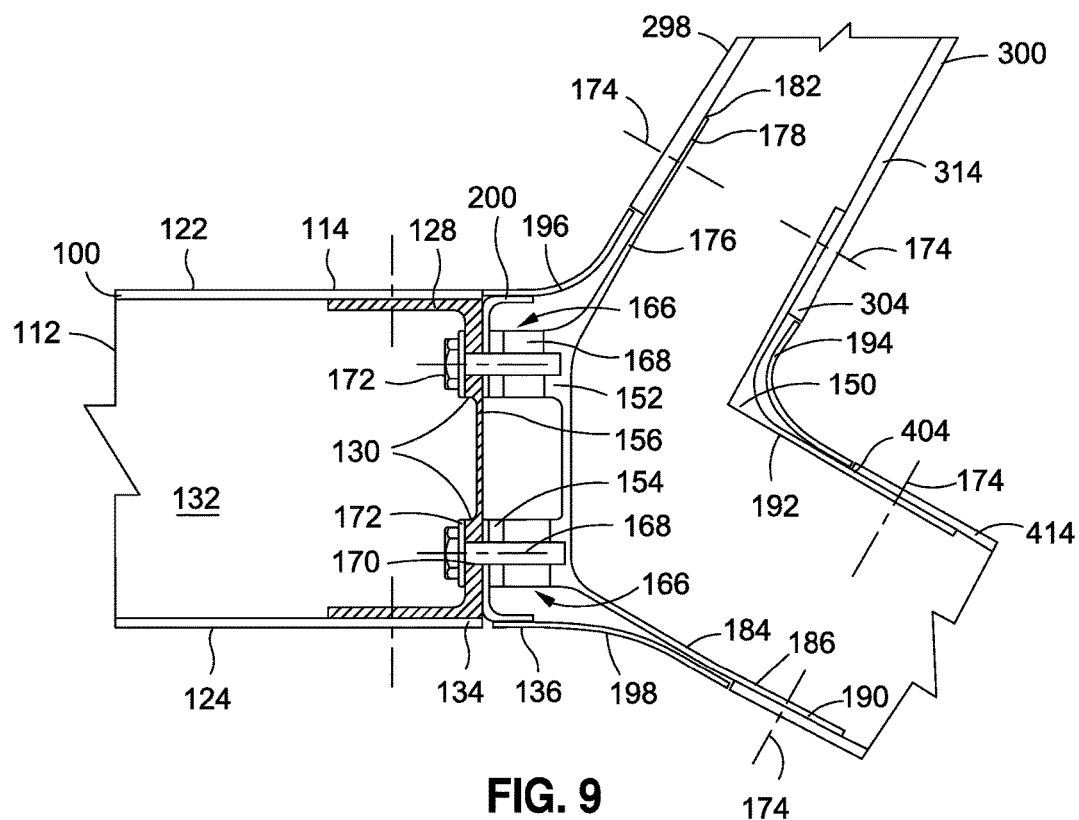
FIG. 9 is a cross-sectional illustration of the split winglet attached to a wing tip using the winglet attach fitting of FIG. 5 and illustrating the tension fasteners installed from the inboard side of the wing tip for fastening the wing attachment portion to the wing tip rib.

FIG. 9 is a cross-section of the unitary structure 192 winglet attach fitting 150 showing the attachment of the upper winglet 300 to the upper winglet attachment portion 176 using shear fasteners 174, and the attachment of the lower winglet 400 to the lower winglet attachment portion 184 using shear fasteners 174. As indicated above, the terminal ends 182, 190 of the upper winglet attachment portion 176 and the lower winglet attachment portion 184 may each be configured as generally hollow box-shaped ducts over which the respective upper winglet 300 and lower winglet 400 (FIG. 4) may be fitted. In this regard, the upper winglet 300 may be stove-piped over the upper winglet attachment portion 176, and the lower winglet 400 may be stove-piped over the lower winglet attachment portion 184. The upper winglet attachment portion 176 and the lower winglet attachment portion 184 may have a step 180, 88 machined or formed in the terminal end 182, 190 for abutting the root end of the upper winglet 300 and the root end of the lower winglet 400.

FIG. 9 illustrates the tension fasteners 172 installed from the inboard side 134 of the wing tip 114 for fastening the wing attachment portion 152 to the wing tip rib 128. The wing tip rib 128 may include a vertical flange 130 on the upper and lower edges of the wing tip rib 128. Fastener bores 170 may be formed through the vertical flanges 130 in alignment with the fastener bores 170 extending through the fitting root end 154 of the wing attachment portion 152. Fastener bores 170 may also be formed at other locations on the wing tip rib 128.

In an embodiment, one or more discrete fairings (not shown) may be attached to the winglet attach fitting 150 (FIG. 9) and/or upper winglet 300 (FIG. 9) and lower winglet 400 (FIG. 4) using small mechanical fasteners extending through the fairing and engaging small barrel nuts, nutplates, threaded bore, or other threaded receptacles. In this regard, the winglet attach fitting 150 may include a winglet upper inner fairing 196 (FIG. 9) and a winglet lower inner fairing 198 mounted on an inboard side 134 of the split winglet 298 for providing an aerodynamically smooth transition from the inboard side 134 of the upper winglet 300 and the lower winglet 400 to the outer mold line of the upper wing skin 122 and the lower wing skin 124. Although not shown, the winglet upper inner fairing 196 and the winglet lower inner fairing 198 may be fastened using threaded fasteners engaged to nutplates or other threaded receptacles mounted on an interior of a fairing bracket 200.

The fairing bracket 200 (FIG. 9) may be sandwiched between the fitting root end 154 and the wing tip rib 128. Alternatively, the outer surface of the winglet attach fitting 150 (FIG. 9) may be sized and configured to function as the fairing between the upper wing skin 122 and upper winglet skin 314 (FIG. 9) and between the lower wing skin 124 and the lower winglet skin 414. A winglet outer fairing 194 may also be installed to provide an aerodynamically smooth transition between the outboard side 136 (FIG. 9) of the upper winglet skin 314 and the outboard side 136 of the lower winglet skin 414. However, in an embodiment not shown, the outer surface of the winglet attach fitting 150 itself may function act as the fairing between the upper winglet skin 314 and the lower winglet skin 414.

Figure 10:
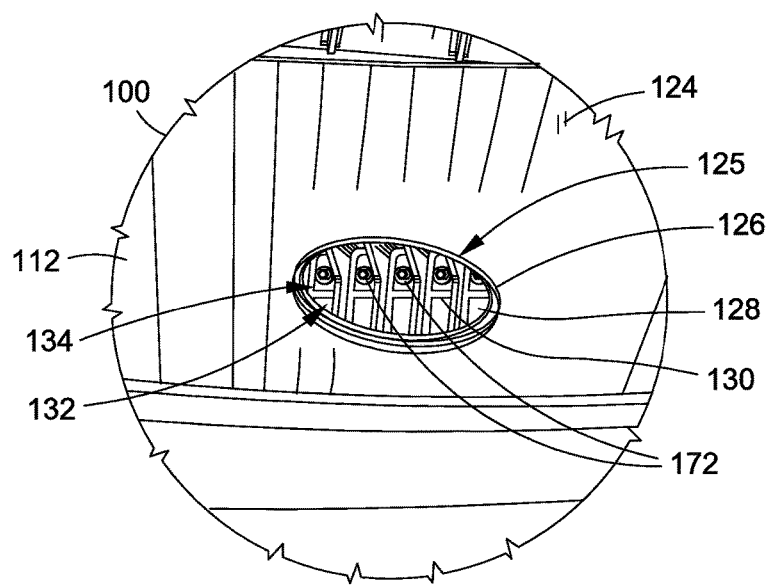
FIG. 10 is a perspective illustration of an underside of the wing taken along line 10 of FIG. 2 and illustrating an access panel allowing for one-sided-access to the wing interior for installing the tension fasteners securing the winglet to the wing tip.

FIG. 10 shows an underside of the wing 112 illustrating an opening 125 that may be uncovered by removing an access panel 126 to provide access to the wing interior 132. The opening 125 may preferably be large enough to allow for insertion of hand tools for installation and removal of the tension fasteners 172. The access panel 126 facilitates one-sided-access to the wing interior 132 for installing the tension fasteners 172 securing the winglet to the wing tip 114. The tension fasteners 172 may be threadably engaged to the barrel nuts 168 (FIG. 9) which may be included in the barrel nut bores 166 (FIG. 9) formed in the fitting root end 154 (FIG. 9) of the wing attachment portion 152 (FIG. 9) of the winglet attach fitting 150 (FIG. 9). In this manner, the winglet attach fitting 150 embodiments disclosed herein provide a means for relatively rapid installation, removal, and replacement of an entire split winglet 298 including the upper winglet 300 and lower winglet. Embodiments of the winglet attach fitting 150 described below may allow for installation, removal, and replacement of lower winglet 400 (FIG. 4) while the upper winglet 300 remains attached to the wing tip 114, or the installation, removal, and replacement of the upper winglet 300 while the lower winglet 400 remains attached to the wing tip 114.

Figure 11:
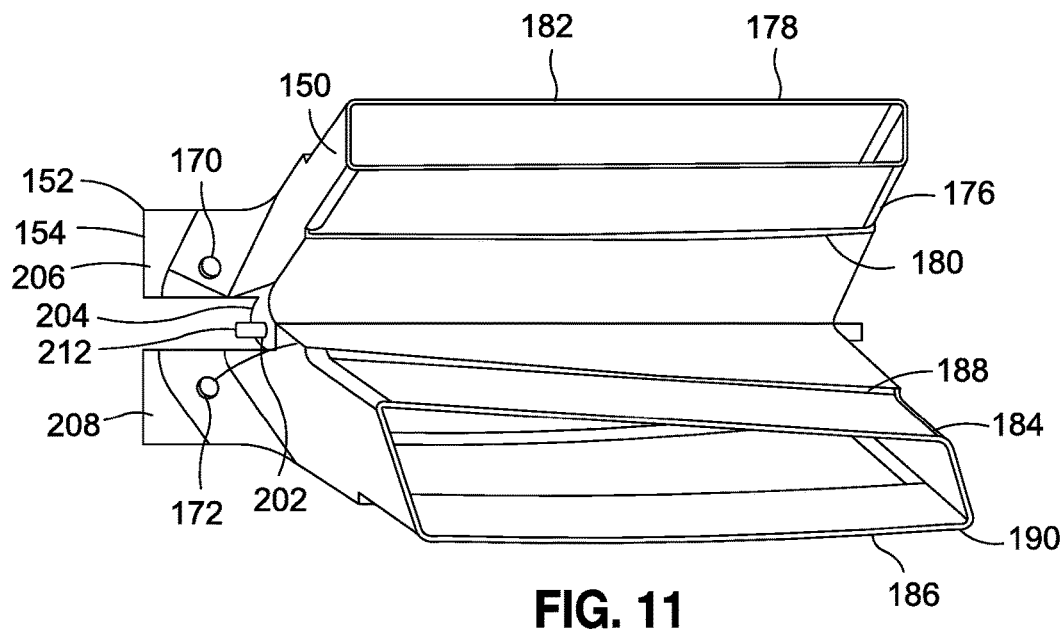
FIG. 11 is a perspective illustration of a further embodiment of the winglet attach fitting comprising an upper bracket and an upper winglet attachment portion hingedly coupled to a lower bracket and a lower winglet attachment portion.
Figure 12:
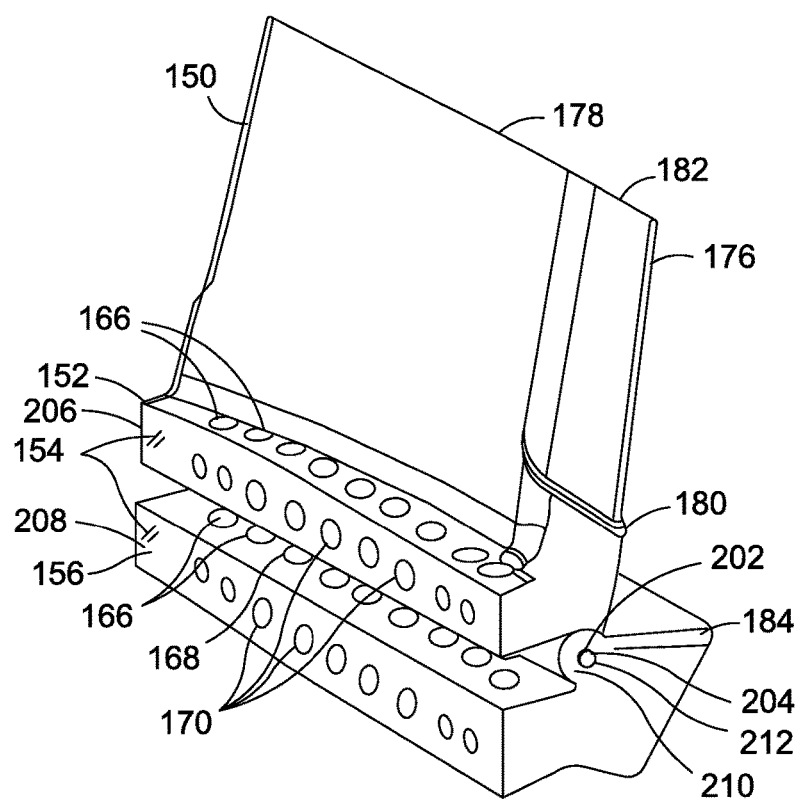
FIG. 12 is a perspective illustration of the wing attachment portion of the winglet attach fitting of FIG. 11.

FIGS. 11-12 show an embodiment of a winglet attach fitting 150 comprising an upper bracket 206 and an upper winglet attachment portion 176 hingedly coupled to a lower bracket 208 and a lower winglet attachment portion 184 by means of a hinge joint 204. The wing attachment portion 152 is comprised of the upper bracket 206 and the lower bracket 208 which are separate components. The upper bracket 206 may be integral with the upper winglet attachment portion 176. For example, the upper bracket 206 and the upper winglet attachment portion 176 may be formed as a unitary structure 192. Likewise, the lower bracket 208 may be integral with the lower winglet attachment portion 184. The single piece of the upper bracket 206 and upper winglet attachment portion 176 may be a separate component from the single piece of the lower bracket 208 and lower winglet attachment portion 184.

In FIGS. 11-12, the single piece of the upper bracket 206 and upper winglet attachment portion 176 may be hingedly coupled to the single piece of the lower bracket 208 and lower winglet attachment portion 184. The upper bracket 206 and the lower bracket 208 may be fastened to the wing tip rib 128 using one or more fasteners such as threaded fasteners (e.g., tension fasteners 174) as mentioned above with regard to FIGS. 4 and 9. The fastening of the upper bracket 206 and the lower bracket 208 to the wing tip rib 128 may prevent movement of the upper bracket 206 and the lower bracket 208 relative to one another. One or more hinge pins 212 may be extended through pin bores 202 formed in hinge bosses 210 of the upper bracket 206 and lower bracket 208. The hinge bosses 210 may be interconnected by the hinge pin 212. The hinge bosses 210 of the upper bracket 206 and lower bracket 208 may mesh with one another to form the hinge joint 204 which may be characterized as a non-rotatable hinge joint 204 when the upper bracket 206 and the lower bracket 208 are fastened to the wing tip rib 128 to retain the upper winglet attachment portion 176 and the lower winglet attachment portion 184 in fixed relationship with one another.

The hinge pin 212 may be oriented in a stream-wise direction such as along a forward direction 110 of the aircraft 100. However, the hinge pin 212 may be oriented in any direction. Advantageously, the hinge pin 212 allows for removal of the lower winglet 400 (FIG. 4) while the upper winglet 300 (FIG. 4) remains attached (e.g., fastened) to the wing tip 114 (FIG. 9), or removal of the upper winglet 300 while the lower winglet 400 remains attached (e.g., fastened) to the wing tip 114. Advantageously, by splitting the winglet attach fitting 150 into two separate components, the depth and contour of the cavities of each component (e.g., the upper bracket 206 and upper winglet attachment portion 176, and the lower bracket 208 and lower winglet attachment portion 184) may be minimized to simplify manufacturing or machining.

Figure 13:
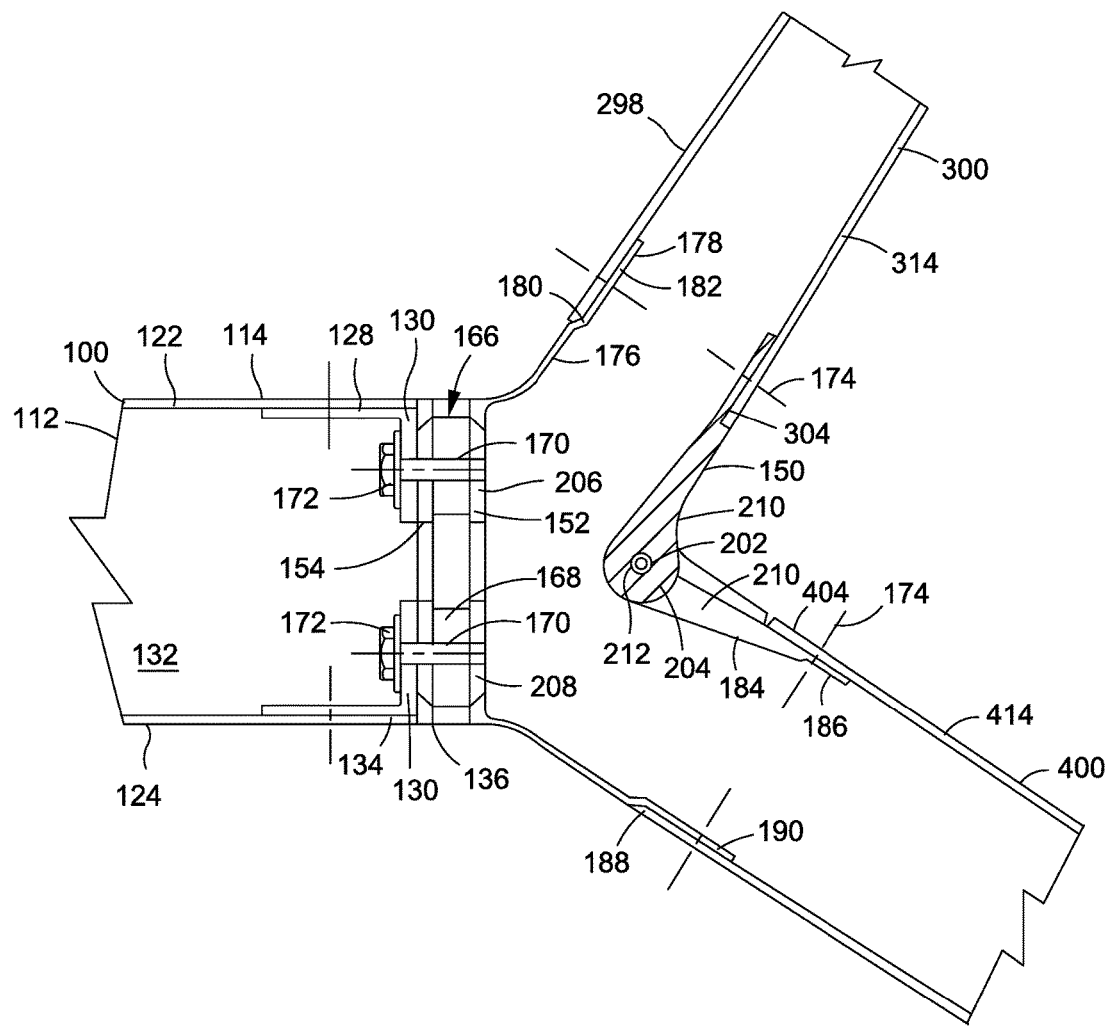
FIG. 13 is a cross-sectional illustration of the split winglet attached to a wing tip using the winglet attach fitting of FIG. 11 and illustrating the tension fasteners fastening the wing attachment portion to the wing tip rib.

In FIG. 12-13, shown is the upper bracket 206 and the lower bracket 208 which are provided as two separate components. The upper bracket 206 and the lower bracket 208 may each be configured similar to the fitting root end 154 shown in FIGS. 5-6 and described above. In this regard, the upper bracket 206 and the lower bracket 208 may each include a series of barrel nut bores 166 for accommodating a plurality of barrel nuts 168. Tension fasteners 172 may be extended through the fastener bores 170 in the wing tip rib 128 and in the upper bracket 206 and lower bracket 208 for engaging the barrel nuts 168 contained in the barrel nut bores 166. Alternatively, the winglet attach fitting 150 may include threaded receptacles other than barrel nuts 168 for receiving the tension fasteners 172, as indicated above with regard to the winglet attach fitting 150 of FIGS. 5-6 and 9. The upper winglet 300 and the lower winglet 400 may be stove-piped onto the respective upper winglet attachment portion 176 and the lower winglet attachment portion 184 using shear fasteners 174 in a manner similar to that shown in FIG. 9 and described above.

Figure 14:
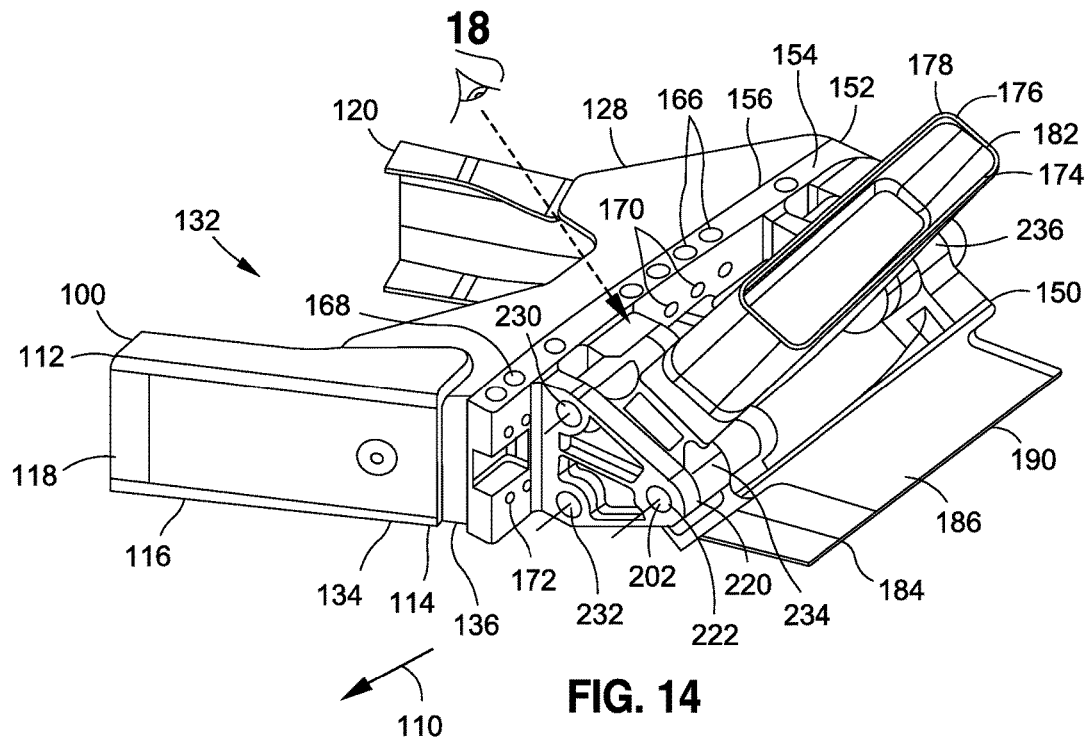
FIG. 14 is a perspective illustration of a further embodiment of the winglet attach fitting wherein the wing attachment portion, the upper winglet attachment portion, and the lower winglet attachment portion are separate components configured to be coupled together using shear pins.

FIG. 14 shows a further embodiment of the winglet attach fitting 150 wherein the wing attachment portion 152, the upper winglet attachment portion 176, and the lower winglet attachment portion 184 comprise three (3) separate components that may be coupled together using shear pins 262. In an embodiment, the shear pins 262 may comprise a pair of center pins 222, a pair of upper shear pins 262 (FIG. 22), and a pair of lower shear pins 262. The upper winglet attachment portion 176 and the lower winglet attachment portion 184 may each include at least one lug 234, 236. In the embodiment shown, the upper winglet attachment portion 176 includes a pair of upper lugs 234 and the lower winglet attachment portion 184 includes a pair of lower lugs 236. However, the upper winglet attachment portion 176 may include any quantity of upper lugs 234. For example, although not shown, the upper winglet attachment portion 176 may include an upper lug 234 aligned with the upper winglet forward spar 308, an upper lug 234 aligned with the mid spar 310, and an upper lug 234 aligned with the rear spar 312. Likewise the lower winglet attachment portion 184 may include a corresponding quantity of lower lugs 236 to match the quantity of upper lugs 234 of the upper winglet attachment portion 176.

The wing attachment portion 152 (FIG. 14) may include at least one clevis 220 such as a root portion clevis 220 extending outwardly from the fitting root end 154 on an outboard side 136 thereof. For example, in the embodiment shown, the wing attachment portion 152 includes a pair of root portion clevises 220 extending outwardly from the fitting root end 154. However, the wing attachment portion 152 may include any quantity of root portion clevises 220 to match the quantity of upper lugs 234 and lower lugs 236. In the embodiment shown in FIG. 14, the pair of upper lugs 234 of the upper winglet attachment portion 176 may be coupled to the pair of root portion devises 220 using at least one pin 222, 230, such as a pair of the upper pins 230 (e.g., forward and aft upper pins 230) and a pair of center pins 222 (e.g., forward and aft center pins 222). Likewise, the pair of lower lugs 236 of the lower winglet attachment portion 184 may be coupled to the pair of root portion devises 220 using a pair of the lower pins 232 (e.g., forward and aft lower pins 232) and the pair of center pins 222 (e.g., forward and aft center pins 222).

However, the upper pins 230, the lower pins 232, and the center pins 222 may be provided in quantities corresponding to the quantity of upper lugs 234, lower lugs 236, and root portion devises 220. For example, the above-mentioned embodiment having three (3) upper lugs 236, three (3) lower lugs 234, and three (3) devises 220, may also include three (3) upper pins 230, three (3) lower pins 232, and three (3) center pins 222 for coupling the lugs 234, 236 to the root portion devises 220. Advantageously, the upper pins 230 may not extend through the lower lug 236, and the lower pins 232 may not extend through the upper lug 234. In this manner, the upper winglet 300 or the lower winglet 400 may be removed from the wing attachment portion 152 without removing the wing attachment portion 152 from the wing tip 114. In an embodiment, the upper pins 230, the lower pins 232, and the center pins 222 may be provided as double-ended studs (not shown).

In an embodiment, the center pins 222 (FIG. 14) and the upper or lower pins 230, 232 may be sized to function as fuse pins to allow the upper winglet 300 and/or lower winglet 400 to separate or break away cleanly from the wing attachment portion 152. For example, upon the application of a forward load or aft load of sufficient magnitude on the lower winglet 400 and/or upper winglet 300 such as may occur during contact of the lower winglet 400 and/or operate winglet with an object, the center pins 222 and upper and/or lower pins 230, 232 may be configured to shear upon the attainment of a predetermined shear load on the center pins 222 and upper and/or lower pins 230, 232.

In a further embodiment, the upper winglet attachment portion 176 may be divided into two separate components (not shown) including one component that may be fastened to the upper winglet skin 314 on an inboard side 134 of the upper winglet 300 and which may include the portion of the upper lugs 234 that are engageable to the root clevis portion 220 using the upper pins 230, and another component that may be fastened to the upper winglet skin 314 on an outboard side 136 of the upper winglet 300 and which may include the portion of the upper lugs 234 that are engageable to the root clevis portion 220 using the center pins 222. Likewise, the lower winglet attachment portion 184 may be divided into two separate components (not shown) including one component that may be fastened to the lower winglet skin 414 on an inboard side 134 of the upper winglet 400 and which may include the portion of the lower lugs 236 that are engageable to the root clevis portion 220 using the lower pins 232, and another component that may be fastened to the lower winglet skin 414 on an outboard side 136 of the lower winglet 400 and which may include the portion of the lower lugs 236 that are engageable to the root clevis portion 220 using the center pins 222. By dividing the upper winglet attachment portion 176 into two separate components, machining and assembly of the upper winglet attachment portion 176 to the upper winglet 300 may be simplified. Such machining and assembly benefits may also apply to a lower winglet attachment portion 184 divided into two separate components.

Figure 15:
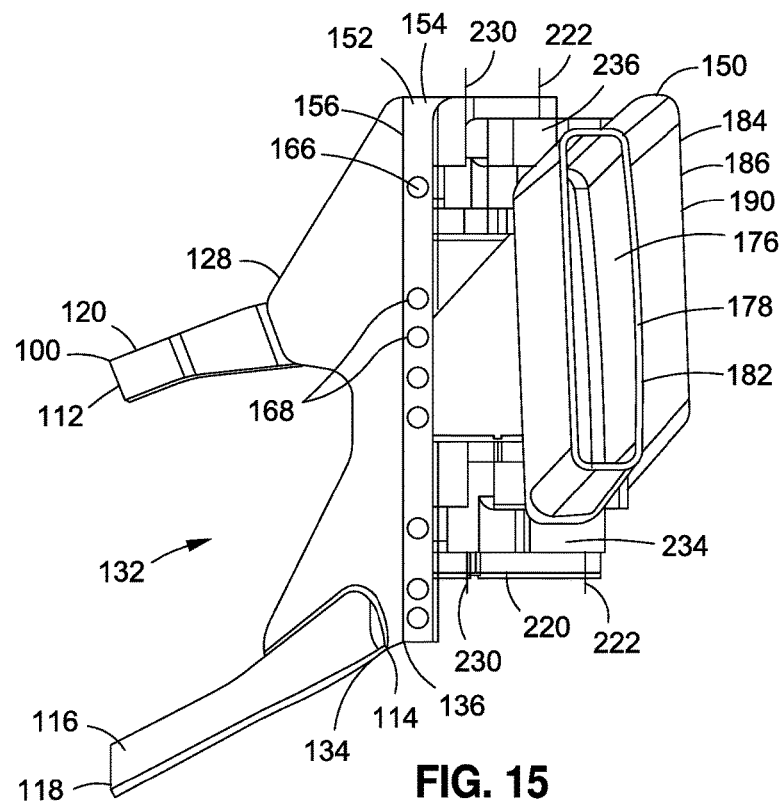
FIG. 15 is a top view of the winglet attach fitting of FIG. 14 and illustrating the wing attachment portion fastened to the wing tip rib.

FIG. 15 shows the wing attachment portion 152 of the winglet attach fitting 150 of FIG. 14 being fastened to the wing tip rib 128 using tension fasteners 172. The fitting root end 154 may be configured substantially similar to the fitting root end 154 of the winglet attach fitting 150 shown in FIGS. 5-6. The tension fasteners 172 may be threadably engaged to the barrel nuts 168 in the wing attachment portion 152. The arrangement may allow the split winglet 298 to be installed and/or removed from the wing tip 114 as a complete unit.

Figure 16:
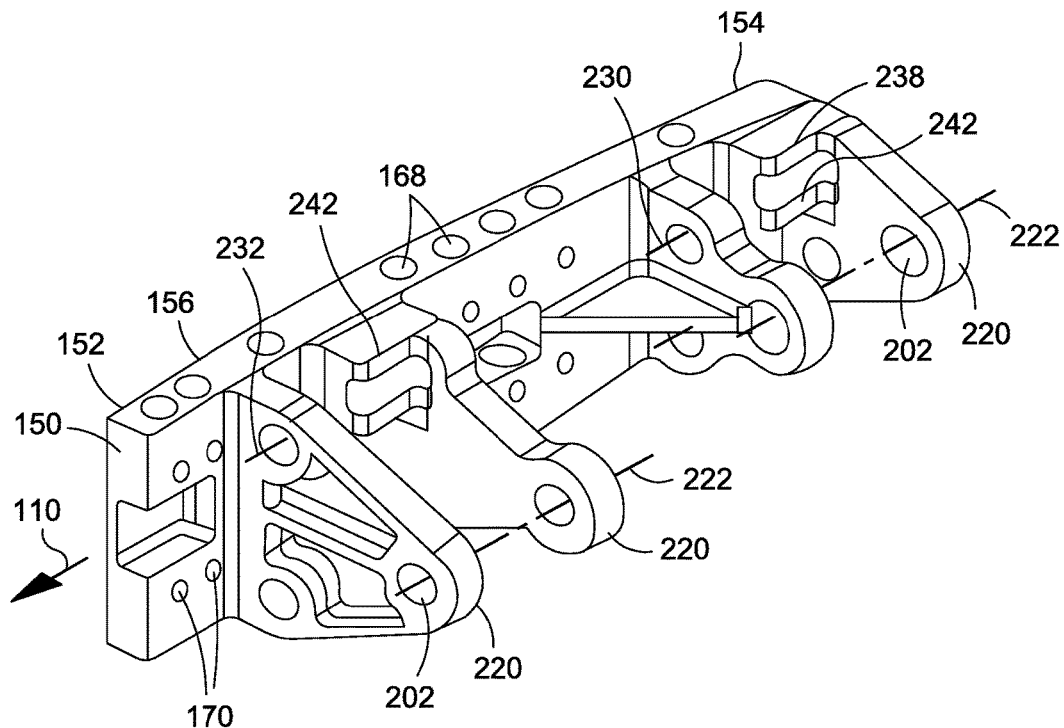
FIG. 16 is a perspective view of the wing attachment portion of the winglet attach fitting of FIG. 14 illustrating an arresting feature incorporated into the wing attachment portion.
Figure 17:
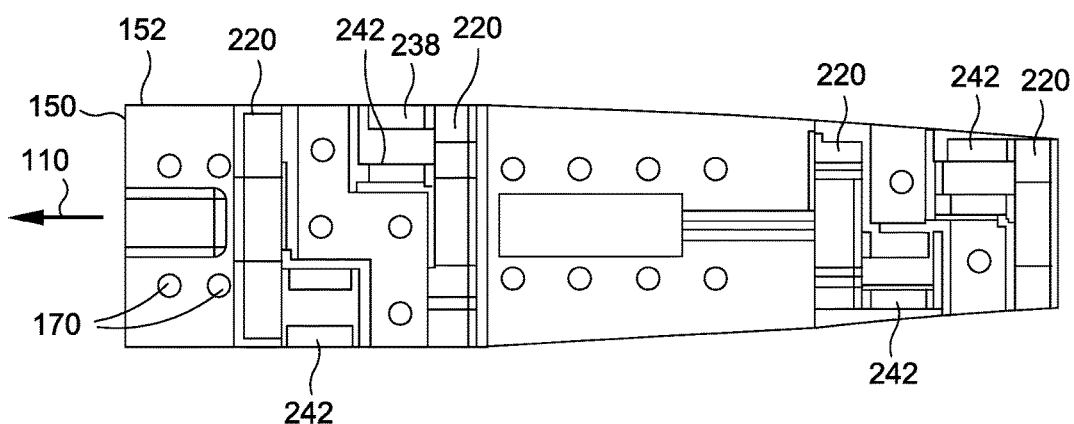
FIG. 17 is a side view of the wing attachment portion of the winglet attach fitting of FIG. 14.

FIGS. 16-17 illustrate the wing attachment portion 152 of the winglet attach fitting 150 of FIG. 15. Shown is the pair of root portion devises 220 extending outwardly from the fitting root end 154. In an embodiment, the wing attachment portion 152 may include one or more arresting features 238. The arresting feature 238 may prevent free (e.g., downward) rotation of the upper lugs 234 of the upper winglet attachment portion 176 and/or the lower lugs 236 of the lower winglet attachment portion 184 relative to the clevis when the center pin 222 is removed from the winglet attachment fitting. In the embodiment shown, the arresting feature 238 comprises a lug bearing portion 240 (FIG. 19) and a clevis bearing portion 242 included with the pair of the upper lugs 234, the pair of the lower lugs 236, and the pair of root portion devises 220.

Figure 18:
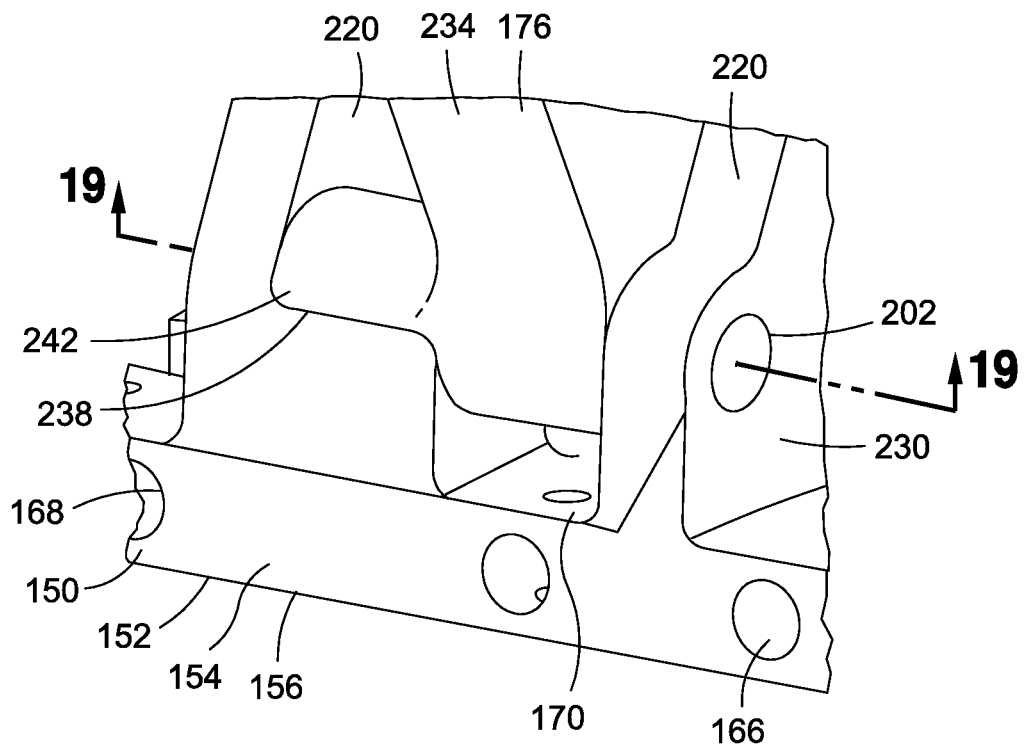
FIG. 18 is a perspective view of a root portion clevis of the fitting root end coupled to an upper lug of the upper winglet attachment portion.
Figure 22:
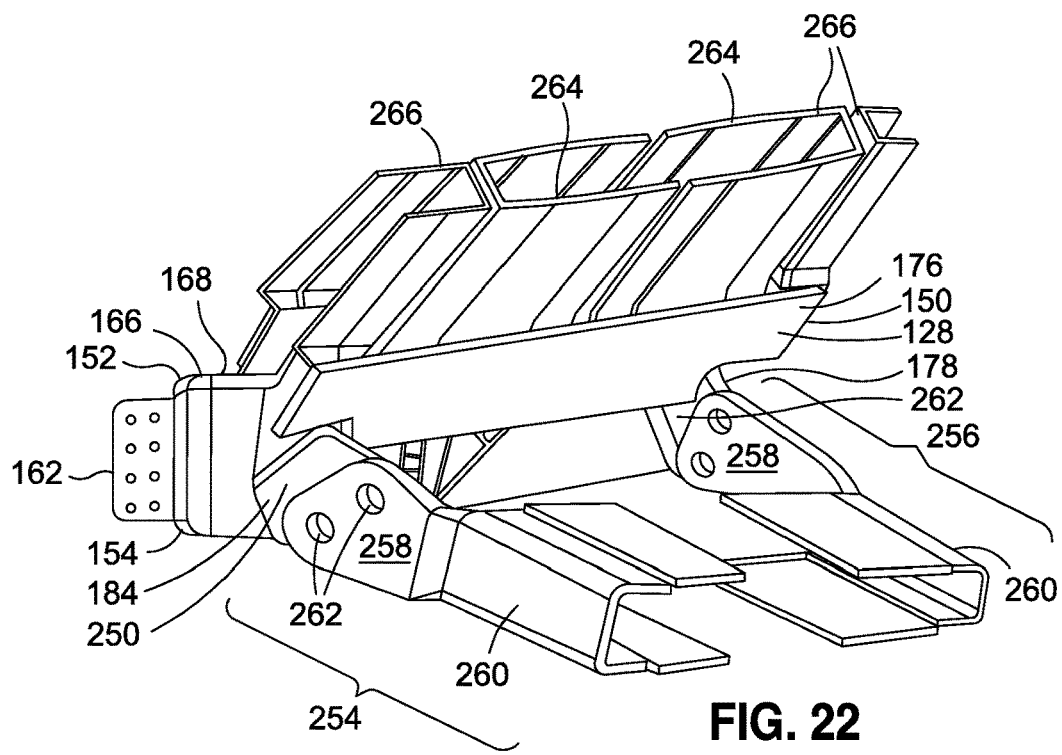
FIG. 22 is a perspective illustration of a further embodiment of the winglet attach fitting having skin splices and spar spices for fastening the upper winglet to the wing attachment portion and the upper winglet attachment portion which are formed as a unitary structure, and further illustrating a pair of clevis fittings for coupling the lower winglet to the lower winglet attachment portion using shear pins.

FIG. 18 is perspective illustration of the coupling of a root portion clevis 220 of the fitting root end 154 to an upper lug 234 of the upper winglet attachment portion 176. Although not shown, an upper pin 230 may couple the root portion clevis 220 to the upper lug 234. A similar arrangement may be provided for coupling the lower lugs 236 of the lower winglet attachment portion 184 to the root portion devises 220. As indicated above, an arresting feature 238 may be incorporated into the root portion clevis 220 and the upper lug 234 to prevent rotation of the upper lug 234 relative to the root portion clevis 220. In the embodiment shown, the arresting feature 238 may comprise a lug bearing portion 240 formed on the upper lug 234 and a mating clevis bearing portion 242 (FIGS. 16-17) that may be formed on the root portion clevis 220, and which may be disposed in abutting contact with one another when the lugs 234, 236 are coupled to the root portion devises 220 by means of the shear pins 262 (FIG. 22).

Figure 19:
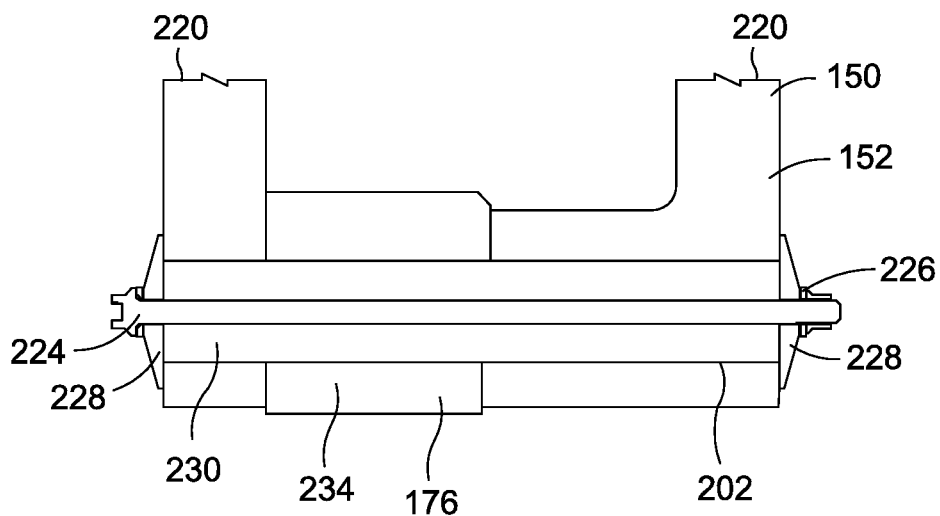
FIG. 19 is a sectional view taken along line 19 of FIG. 18 and illustrating the center pin coupling the root portion clevis to the upper lug.

FIG. 19 illustrates an embodiment of the upper pin 230 coupling the upper winglet attachment portion 176 to the root portion clevis 220 extending outwardly from the fitting root end 154 (FIG. 18). The upper pin 230 may include a retaining pin 224 that may extend through a center of the upper pin 230. Retaining clips 228 may be mounted on opposite sides of the root portion clevis 220. A nut 226 may be secured on one end of the retaining pin 224. The center pin 222 (FIG. 16) and the lower pins 232 (FIG. 16) may include retaining pins 224 and retaining clips 228 similar to the arrangement of the upper pin 230 illustrated in FIG. 19. In an embodiment, the center pin 222 may be provided in a larger diameter than the upper pin 230 and the lower pin 232 to accommodate larger shear loads in the center pin 222.

Figure 20:
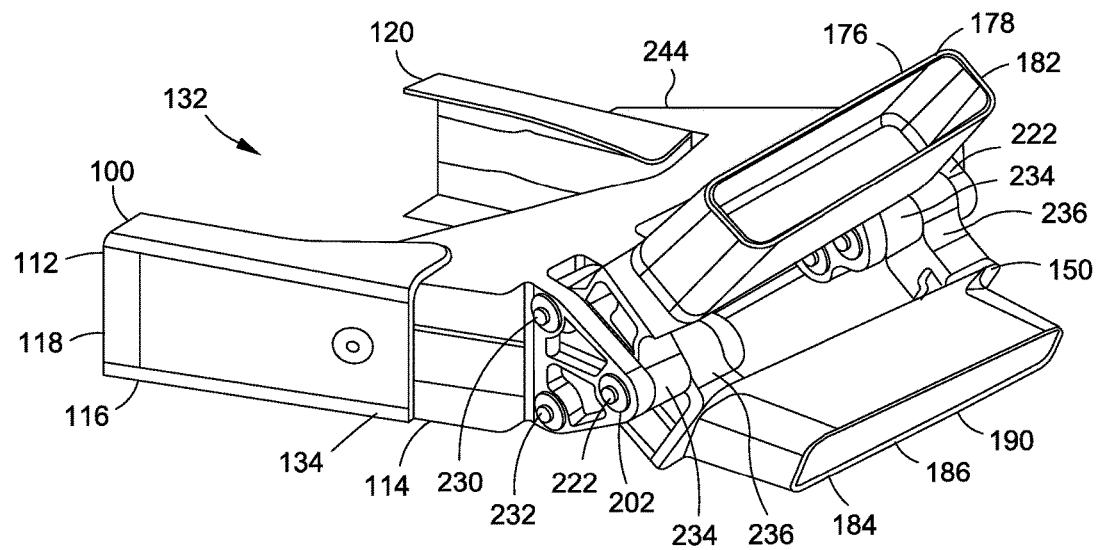
FIG. 20 is a perspective view of the wing attachment fitting in an embodiment wherein the fitting root end is integrally formed with the wing tip rib.
Figure 21:
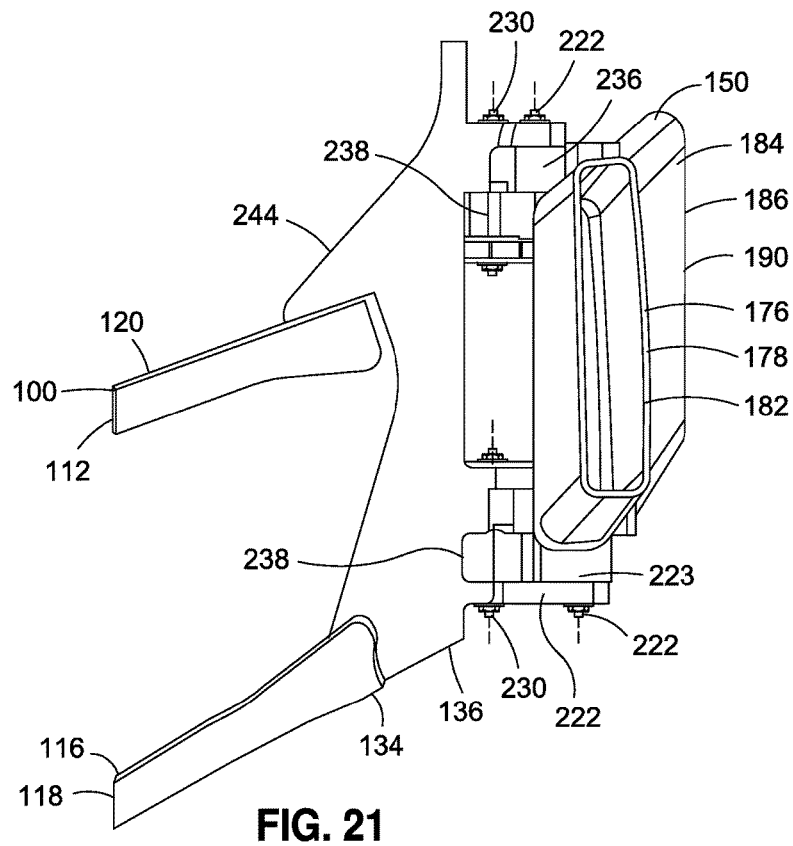
FIG. 21 is a top view of the wing attach fitting of FIG. 20.

FIGS. 20-21 shown is an embodiment of the winglet attach fitting 150 which may be configured similar to the winglet attach fitting 150 embodiments shown in FIGS. 14-15 and described above, but wherein the fitting root end 154 of the wing attachment portion 152 in FIGS. 20-21 is integral 244 with the wing tip rib 128. In this regard, the wing attachment portion 152 may be configured to be attached to an end of one or more wing spars 116. For example, in the embodiment shown, the integral wing attachment portion 152/wing tip rib 128 may be fastened to the wing forward spar 118 and wing aft spar 120. Advantageously, for the embodiment shown in FIGS. 20-21, the integration of the wing attachment portion 152 with the wing tip rib 128 results in a significant reduction in mass relative to a separately-formed wing attachment portion 152 and wing tip rib 128. The significant reduction in mass of the integral wing attachment portion 152/wing tip rib 128 is due to the elimination of barrel nuts 168 (FIG. 16) and the bearing material in the winglet attach fitting 150 surrounding the barrel nuts 168 for transferring load from the upper and lower winglet 300, 400 to the wing tip rib 128.

A further advantage provided by the integral wing attachment portion 152/wing tip rib 128 of FIGS. 20-21 is an elimination of the need to access the wing interior 132 for one-sided installation of tension fasteners 172. The need to access the wing interior 132 is eliminated by the ability to remove the upper winglet 300 and/or the lower winglet 400 by removing the upper and/or lower pins 230, 232 and center pins 222 as mentioned above. The integrally-formed wing attachment portion 152/wing tip rib 128 may be implemented on any one of the winglet attach fittings 150 disclosed herein.

FIG. 22 illustrates a further embodiment of a winglet attach fitting 150 wherein the wing attachment portion 152 and the upper winglet attachment portion 176 are formed as a unitary structure and the lower winglet 400 attachment portion may be separately joined to the wing attachment portion 152 using shear pins 262. The wing attachment portion 152 may include a fitting root end 154 that may be configured similar (e.g., with barrel nuts 168, mechanical fasteners, or other threaded receptacles) to the fitting root end 154 of the above-described winglet attach fittings 150. The upper winglet 300 may be fastened to the upper winglet attachment portion 176 using skin spices 264 and/or spar splices 266. The lower winglet 400 may be coupled to the lower winglet attachment portion 184 using clevis fittings 254, 256 which may allow for removably fastening the lower winglet 400 to the wing attachment portion 152.

Figure 23:
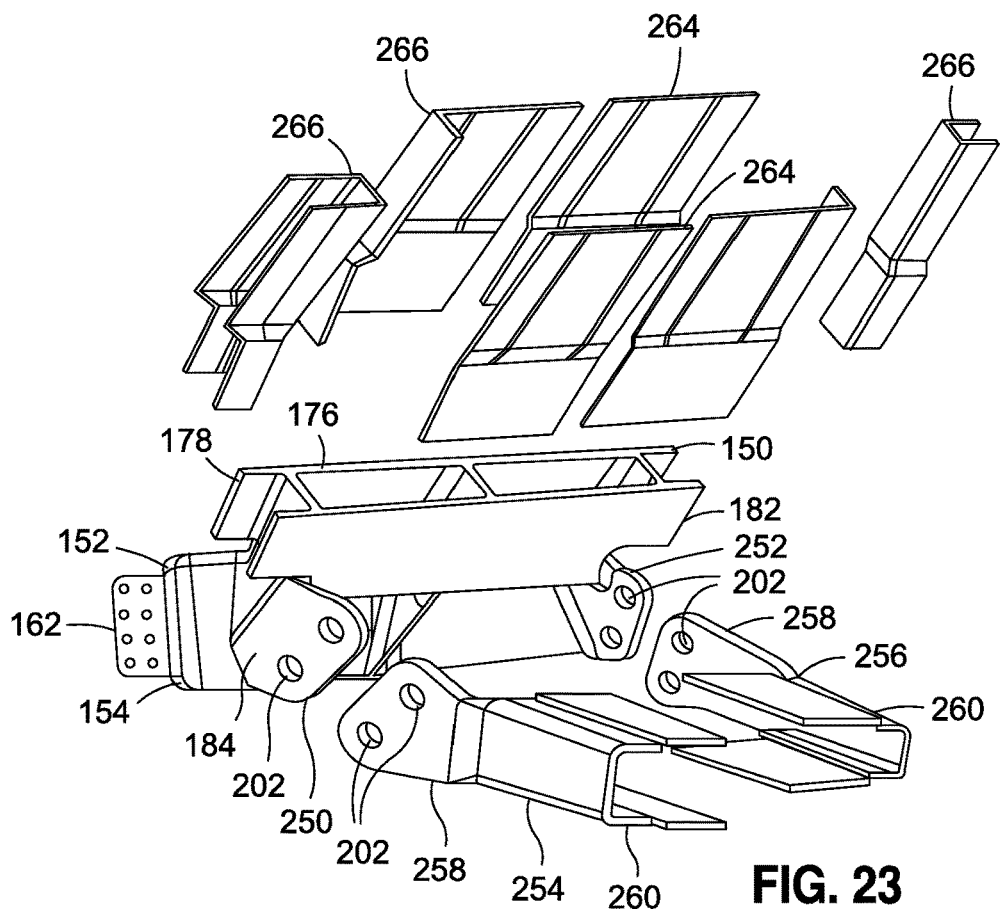
FIG. 23 is a an exploded perspective view of the wing attach fitting, the skin splices and spar splices, and forward and aft clevis fittings shown in FIG. 22.

FIG. 23 shows an exploded view of the winglet attach fitting 150 of FIG. 22 and illustrating a plurality of the skin splices 264 and a plurality of spar splices 266 for coupling the upper winglet 300 to the upper winglet attachment portion 176. The lower winglet attachment portion 184 may also be integral with the upper winglet attachment portion 176, and may include one or more lugs 250, 252 extending outwardly from the lower winglet attachment portion 184. For example, FIG. 23 illustrates a forward lug 250 and an aft lug 252 extending from the lower winglet attachment portion 184.

In FIG. 23, shown are clevis fittings 254, 256 for coupling the lower winglet 400 to the lower winglet attachment portion 184. In an embodiment, the clevis fittings 254, 256 may be fastened to the lower winglet 400. The clevis fittings may comprise a forward clevis fitting 254 and an aft clevis fitting 256 for respectively coupling to a forward lug 250 and an aft lug 252 of the lower winglet attachment portion 184 using shear pins 262. In an embodiment, each clevis fitting 254, 256 may be coupled to a lug 250, 252 with a pair of shear pins 262 that may be extended through pin bores 202 formed in the clevis fittings 254, 256 and lugs 250, 252. By providing at least two shear pins 262 in at least one of the clevis/lug connections, the angular orientation of the lower winglet 400 may be non-rotatably fixed relative to the wing tip 114. In an embodiment, the shear pins 262 may be configured to shear at a predetermined shear load to allow for separation of the lower winglet 400 without damage to the wing 112 in the event of impact of the lower winglet 400 with an object.

Figure 24:
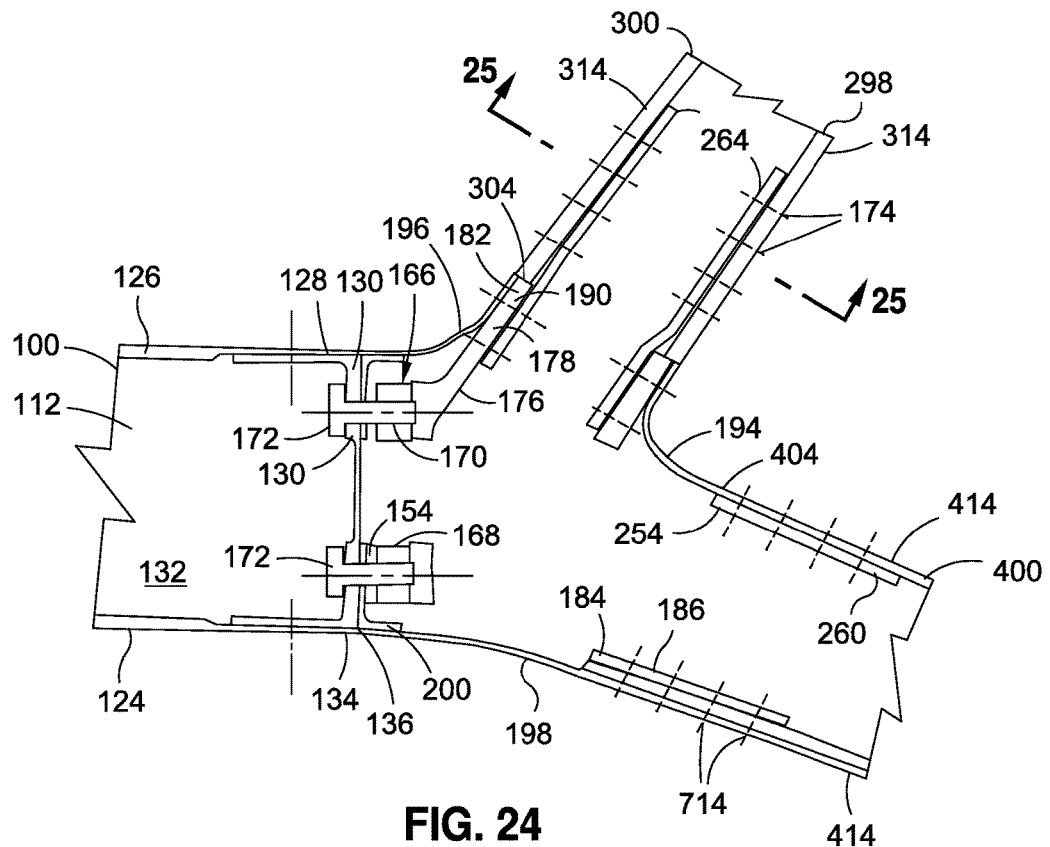
FIG. 24 is a cross-sectional illustration of the wing attach fitting of FIG. 23 coupled to the wing tip rib using tension fasteners, and further illustrating the skin splices coupling the upper winglet to the upper winglet attachment portion, and the clevis fittings coupling the lower winglet to the lower winglet attachment portion using shear fasteners.

Referring to FIG. 24, shown is a cross-section of the winglet attach fitting 150 of FIG. 23 coupling the upper winglet 300 and the lower winglet 400 to the wing tip 114. The wing attachment portion 152 may be fastened to the wing tip rib 128 using tension fasteners 172 which may be engaged to barrel nuts 168 contained within the fitting root end 154 of the wing attachment portion 152 similar to the above-described arrangements illustrated in FIGS. 9 and 13. The skin splices 264 may be installed against the inner surface of the upper winglet skin 314 and fastened to the upper winglet skin 314 using shear fasteners 174 such as lock bolts or other fasteners. Spar splices 266 may be installed against the surfaces of the winglet spars 310, 312, 314. The spar splices 266 and winglet spars 310, 312, 314 may be fastened together using mechanical fasteners.

Figure 25:
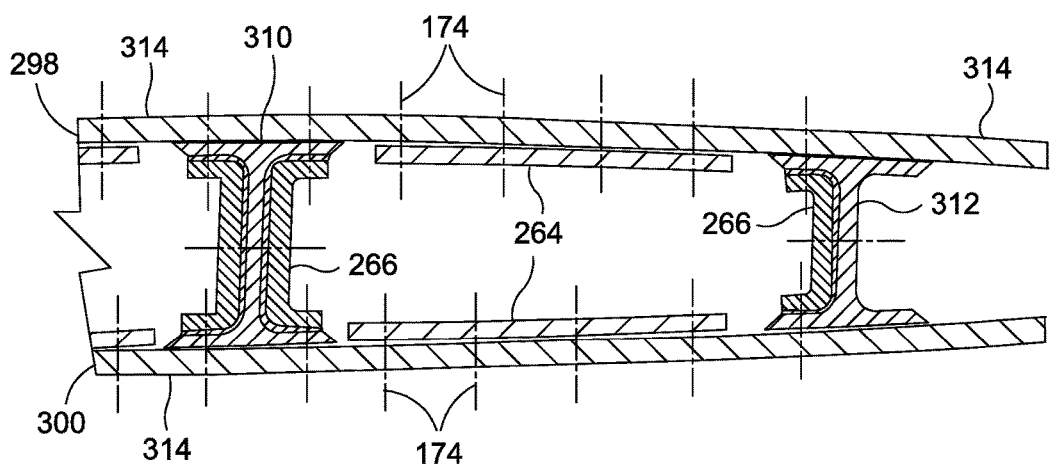
FIG. 25 is a cross-sectional illustration of the winglet attach fitting taken along line 25 of FIG. 24 and illustrating the skin splices and spar splices fastened to the upper winglet using shear fasteners.

Referring to FIG. 25, shown are the skin splices 264 and spar splices 266 fastened to the upper winglet 300. The skin splices 264 may be fastened to the upper winglet skin 314 using one or more shear fasteners 174. The spar splices 266 may be fastened to one or more of the winglet spars 310, 312, 314 using one or more mechanical fasteners. Although not shown, one or more of the splices may be configured as a combination skin splice/spar splice and may be fastened to the upper winglet skin 314 and/or one or more winglet spars 310, 312, 314 using mechanical fasteners. In an embodiment, the skin splices 264 and the spar splices 266 may be formed of a material that minimizes galvanic corrosion. For example, the skin splices 264 and the spar splices 266 may be formed of titanium to minimize galvanic corrosion with a composite (e.g., carbon fiber epoxy) upper winglet 300. However, the skin splices 264 and the spar splices 266 may be formed of other materials such as aluminum, steel, or nonmetallic material.

In FIG. 25, the splice portion 260 of the clevis fittings may be installed against the inner surface of the upper winglet skin 314 and/or winglet spars 310, 312, 314 and fastened thereto using mechanical fasteners. The upper winglet 300 may be coupled to the upper winglet attachment portion 176 by inserting the skin splices 264 and spar splices 266 into the terminal end 182 of the upper winglet attachment portion 176 and securing with the mechanical fasteners. The lower winglet 400 may be coupled to the winglet attach fitting 150 by aligning the clevis portion 258 of the clevis fittings 254, 256 with the lugs 250, 252 extending outwardly from the lower winglet attachment portion 184. Shear pins 262 may be inserted into the pin bores 202 to non-rotatably fix the lower winglet 400 to the winglet attach fitting 150.

In the embodiments shown in FIGS. 24-25, the skin splices 264 may be configured to act as doublers. For example, the walls 178 of the upper winglet attachment portion 176 may be configured to overlap (not shown) the lower edges of the upper winglet skin 314 with one or two rows of shear fasteners 174. The skin splices 264 may be fastened to the overlap of the walls 178 of the upper winglet attachment portion 176 over the upper winglet skin 314, and the skin splices 264 may extend further into the upper winglet 300 and pick up additional rows of shear fasteners 174. Such an arrangement would assist in transferring load from the upper winglet 300 to the wing tip 114. A similar arrangement may be provided for the lower winglet 400 wherein the walls 186 of the lower winglet attachment portion 184 may overlap a portion of the lower winglet skin 414 for one or two rows of shear fasteners 174, and the skin splices 264 may extend further into the lower winglet 400 to pick up additional rows of shear fasteners 174 to assist in transferring load from the lower winglet 400 to the wing tip 114.

In any of the embodiments disclosed herein, the winglet attach fitting 150 may be formed of a material that provides suitable strength and stiffness characteristics for attaching the upper winglet 300 and the lower winglet 400 to the wing tip 114. In an embodiment, the winglet attach fitting 150 may be formed of a metallic material such as aluminum, titanium, or other materials. However, the winglet attach fitting 150 may also be formed of a composite material (e.g., carbon fiber epoxy), or as a combination of composite material and metallic material, or other material.

Figure 26:
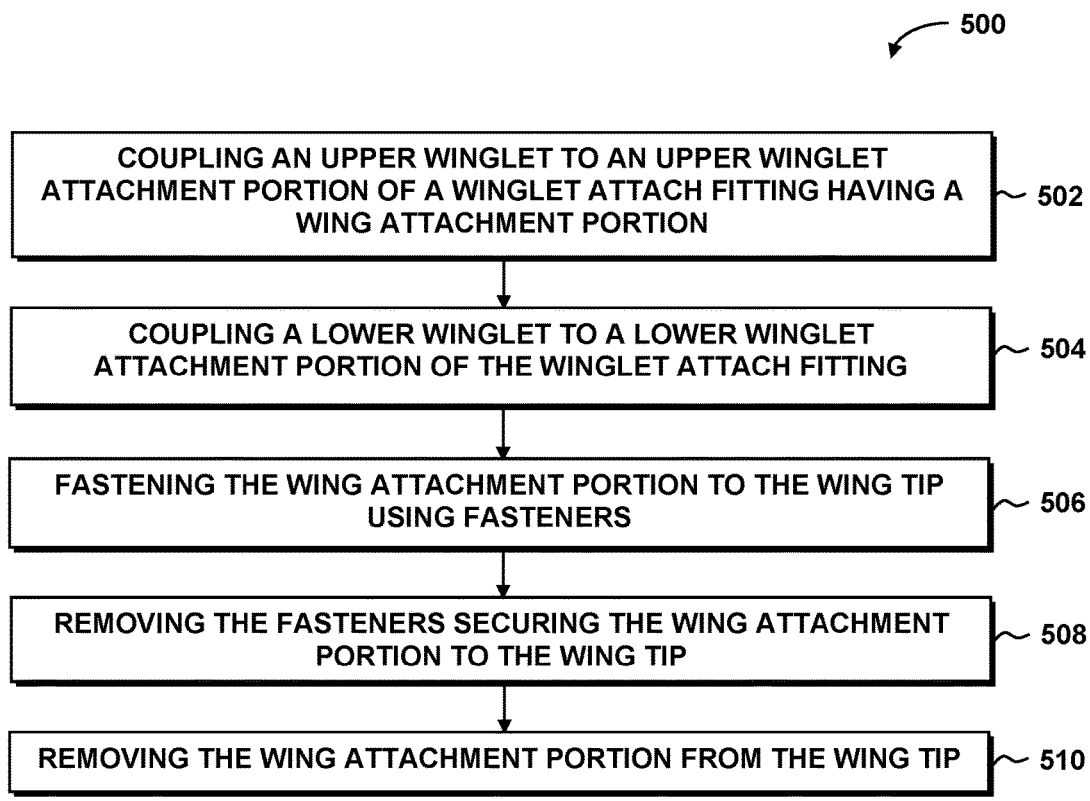
FIG. 26 is a flow chart illustrating an embodiment of a method for securing a split winglet to a wing tip.

In FIG. 26, shown is a flowchart of an embodiment of a method 500 of securing a split winglet 298 to a wing tip 114 of a wing 112. Advantageously, the method provides a means for attaching an upper winglet 300 and a lower winglet 400 to a wing tip 114 of a wing 112 with one-sided access to the wing tip 114. In addition, the method provides a means for removing the upper winglet 300 from the wing tip 114 without removing the lower winglet 300, and removing the lower winglet 400 from the wing tip 114 without removing the upper winglet 300, and without separating or detaching the winglet attach fitting 150 from the wing tip 114.

Step 502 of the method 500 of FIG. 26 may include coupling an upper winglet 300 to an upper winglet attachment portion 176 of a winglet attach fitting 150 having a wing attachment portion 152. For example, as shown in FIGS. 9, 13, and 14, the winglet attach fittings 150 are configured such that the upper winglet 300 may be stove-piped over the terminal end 182 of the upper winglet attachment portion 176. In the embodiment shown, shear fasteners 174 may be extended through the upper winglet skin 314 and into the walls 178 of the terminal end 182 of the upper winglet attachment portion 176. In a further embodiment of the winglet attach fitting 150 shown in FIG. 22, the upper winglet 300 may be attached to the upper winglet attachment portion 176 by means of skin splices 264 and/or spar splices 266 as mentioned above. The skin splices 264 and/or spar splices 266 may be fastened to the upper winglet skin 314 using shear fasteners 174. Mechanical fasteners may fasten the upper winglet 300 spars to the spar splices 266.

Step 504 of the method 500 of FIG. 26 may include coupling the lower winglet 400 to the lower winglet attachment portion 184 of the winglet attach fitting 150. FIGS. 9, 13, and 14 illustrate an embodiment of the winglet attach fitting 150 wherein the lower winglet 400 is stove-piped over the terminal end 190 of the lower winglet attachment portion 184 and secured with shear fasteners 174 extended through the lower winglet skin 414 and into the walls 186 of the terminal end 190 of the lower winglet attachment portion 184. In the embodiment of the winglet attach fitting 150 shown in FIG. 22, the upper winglet 300 may be attached to the upper winglet attachment portion 176 by means of skin splices 264 and/or spar splices 266 which may be fastened to the upper winglet 300 using shear fasteners 174 installed through the upper winglet skin 314. Mechanical fasteners may be used to fasten the spar splices 266 to the winglet spars 310, 312, 314.

In the embodiment of the winglet attach fitting 150 shown in FIGS. 11-13, the upper winglet attachment portion 176 may be secured to the lower winglet attachment portion 184 by means of one or more hinge pins 212. In an embodiment of the winglet attach fitting 150 shown in FIGS. 15-21, the upper winglet attachment portion 176 may be secured to the lower winglet attachment portion 184 by means of center pins 222 and upper and lower pins 230, 232 extended through lugs 234, 236 and root portions devises 220. For the winglet attach fitting 150 of FIGS. 15-21, the method may include placing one or more lug bearing portions 240 into bearing contact with the clevis bearing portions 242 of the devises 220 to prevent rotation of the upper winglet 300 and/or the lower winglet 400 after removing the center pin 222.

Step 506 of the method 500 of FIG. 26 may include fastening the wing attachment portion 152 to a wing tip 114 using tension fasteners 172. As indicated above, the tension fasteners 172 may be passed into the wing interior 132 such as through an opening 125 covered by an access panel 126 on the lower wing skin 124 as shown in FIG. 10. The tension fasteners 172 may be inserted into fastener bores 170 in the wing tip rib 128 and threadably engaged to barrel nuts 168 or other threaded receptacles contained within or mounted to the wing attachment portion 152. Advantageously, the winglet attach fitting 150 allows for one-sided installation of the tension fasteners 172 such as from an inboard side 134 of the wing tip 114 for securing the split winglet 298 to the wing.

Step 508 of the method 500 of FIG. 26 may include removing the winglet attach fitting 150 from the wing 112 by removing the tension fasteners 172 securing the wing attachment portion 152 to the wing tip 114. The tension fasteners 172 may be accessed and/or removed through the opening 125 in the wing skin 122, 124 and which may be covered by an access panel 126. For the embodiments of the winglet attach fitting 150 shown in FIGS. 5-6, 10-12, and 14-15, the removal of the tension fasteners 172 may allow for removing the wing attachment portion 152 from the wing tip 114 while the upper winglet 300 and/or the lower winglet 400 remain attached to the wing attachment portion 152.

For the embodiment of the winglet attach fitting 150 shown in FIGS. 11-13, the method may include removing the hinge pin 212 attaching the upper winglet attachment portion 176 to the lower winglet attachment portion 184, and removing the tension fasteners 172 securing the upper bracket 206 and/or the lower bracket 208 to the wing tip 114 as shown in FIG. 13. Following 112 the removal of the tension fasteners 172, the method may further include removing the upper winglet 300 and/or the lower winglet 400 from the wing tip 114. For the embodiment of the winglet attach fitting 150 shown in FIGS. 14-15, the method may include removing the center pins 222 interconnecting the upper lugs 234 of the upper winglet attachment portion 176 with the lower lugs 236 of the lower winglet attachment portion 184 and the clevises of the wing attachment portion 152. The method may additionally include removing the upper pins 230 and/or lower pins 232 (e.g., shear pins) securing the upper winglet attachment portion 176 and the lower winglet attachment portion 184 to the devises 220, followed by removing the upper winglet 300 and/or the lower winglet 400 from the wing attachment portion 152.

For the embodiment of the winglet attach fitting 150 shown in FIGS. 22-25, the method may include removing the shear pins 262 securing the fitting lugs 250, 252 of the lower winglet attachment portion 184 to the clevis fittings 254, 256 that may be fastened to the lower winglet 300. Following 112 the removal of the shear pins 262, the method may include removing the lower winglet 400 from the wing attachment portion 152 while the upper winglet 300 remains attached to the wing tip 114. Advantageously, the winglet attach fitting 150 shown in FIGS. 22-25 allows for quickly removing and/or reinstalling the lower winglet 400 by the removal of a relatively small quantity of shear pins 262 (e.g., four (4) shear pins).

Figure 27:
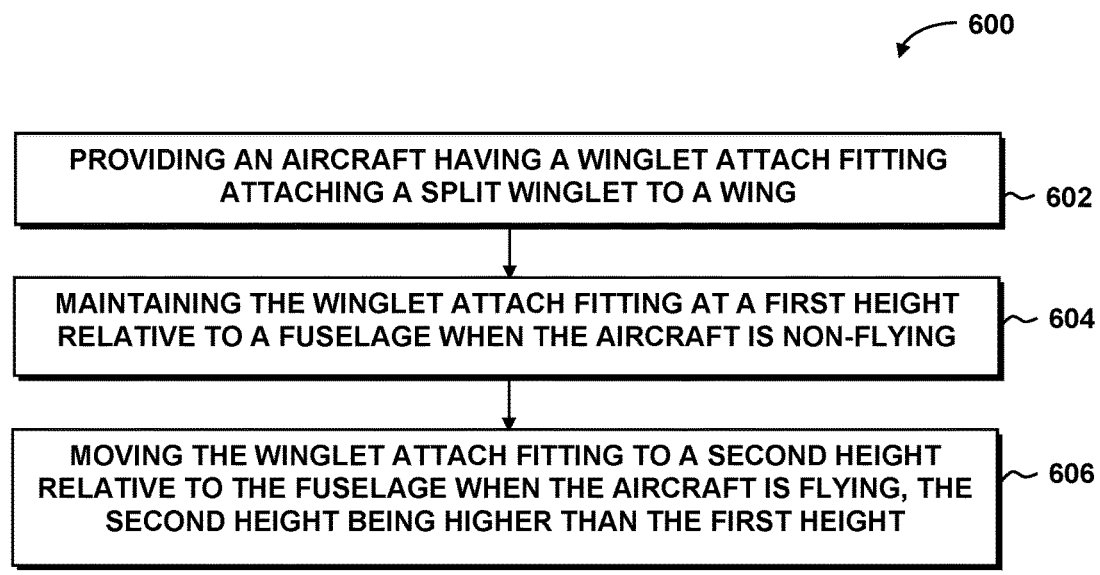
FIG. 27 is a flow chart illustrating an embodiment of a method of using a winglet attach fitting.

Referring to FIG. 27, shown is a flow chart illustrating operations that may be included in a method 600 of using a winglet attach fitting 150. Step 602 of the method 600 may comprise providing an aircraft 100 having a winglet attach fitting 150 that may attach a split winglet 298 to a wing 112 (FIG. 2) of the aircraft 100 (FIG. 2). The split winglet 298 may be attached to the aircraft 100 using any one of the above-described embodiments of the winglet attach fitting 150 and which may be illustrated in the figures, and which may include other winglet attach fitting 150 embodiments within the scope of the present disclosure.

Step 604 of the method 600 of FIG. 27 may comprise maintaining the winglet attach fitting 150 at a first height (not shown) relative to the fuselage (FIG. 2) when the aircraft 100 is non-flying such as when the aircraft 100 is on the ground and/or in a static position (not shown) such as parked at an airport terminal gate. In a static position, a substantial majority of the weight of the aircraft 100 may be supported by the aircraft landing gear (not shown) such that the wings 112 may assume a slightly downwardly-deflected shape under a ground static loading. The ground static loading on the wings 112 may be due to gravitational force acting on the mass of the wing structure, fuel, the propulsion units, and/or other systems that may be supported by the wings 112.

Step 606 of the method 600 of FIG. 27 may comprise moving the winglet attach fitting 150 to a second height (not shown) relative to the fuselage (FIG. 2) when the aircraft 100 is flying and wherein the second height is higher than the first height. The movement of the winglet attach fitting 150 from the first height to the second height may occur as a result of aeroelastically upward deflection of the wings 112 such as under an approximate 1-g flight loading. The upward deflection of the wings 112 may cause the wing tips 114, the wing attach fittings 150, and/or the split winglets 298 to move upwardly toward the second height. The movement of the winglet attach fitting 150 toward the second height may occur when at least a portion of the weight of the aircraft 100 is supported by the wings 112 such as during takeoff from a runway, during climb-out, during level cruise flight, or during any other portion of a flight wherein at least a portion of the aircraft 100 weight is supported by the wings 112.

Figure 28:
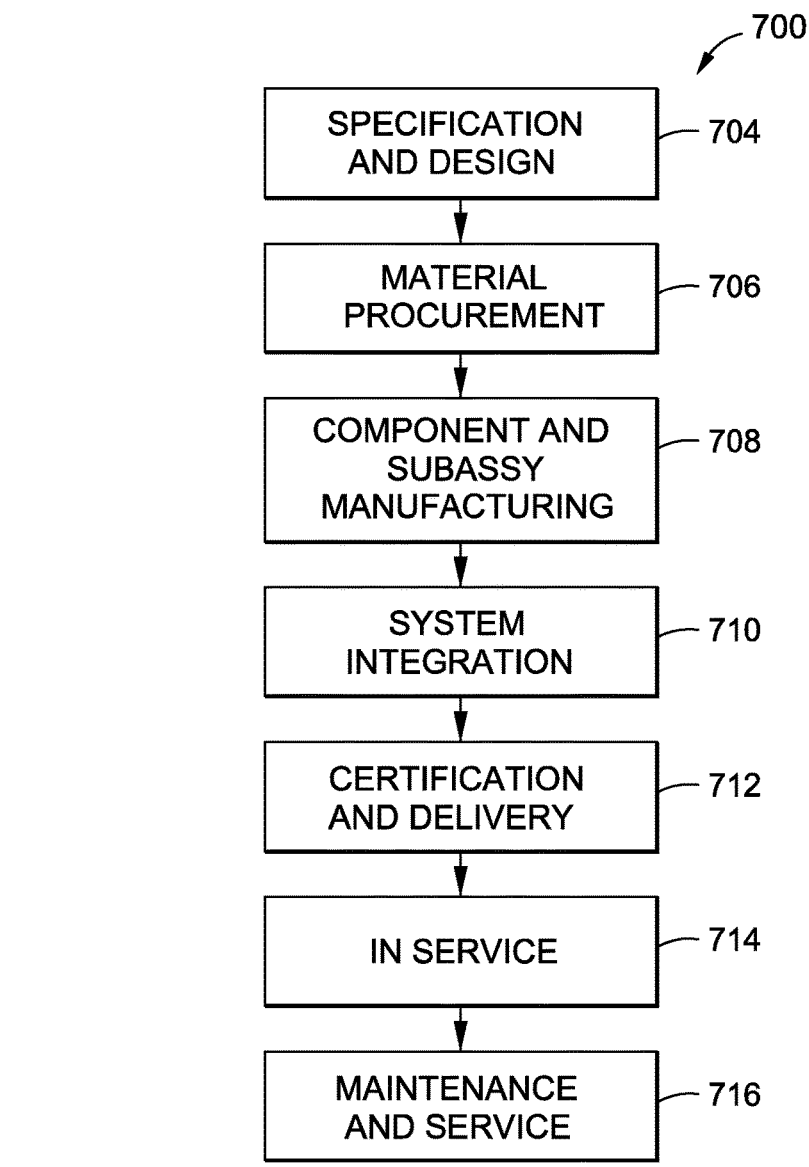
FIG. 28 is a flow diagram of an aircraft manufacturing and service methodology.
Figure 29:
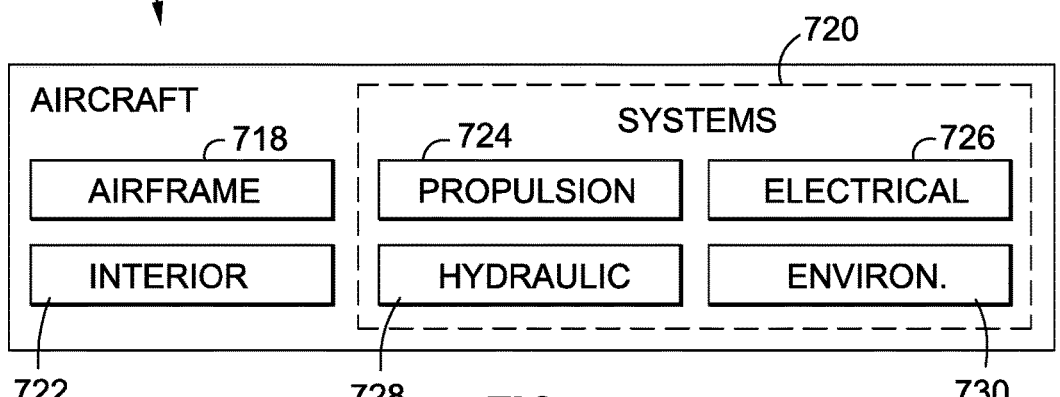
FIG. 29 is a block diagram of an aircraft.

Referring to FIGS. 28-29, embodiments of the disclosure may be described in the context of an aircraft manufacturing and service method 700 as shown in FIG. 28 and an aircraft 702 as shown in FIG. 29. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 29 the aircraft 702 produced by exemplary method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the disclosed embodiments may be applied to other industries, such as the automotive industry.

Apparatus and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of securing a split winglet to a wing tip of a wing of an aircraft comprising the steps of:
attaching an upper winglet to an upper winglet attachment portion of a winglet attach fitting having a wing attachment portion by:
insertably stove-piping or sliding a generally hollow, box-shaped terminal end of the upper winglet attachment portion into a generally hollow interior of the upper winglet at an upper winglet root end, the upper winglet attachment portion oriented at a dihedral angle; and extending at least one fastener through the upper winglet attachment portion and into an upper winglet skin;

attaching a lower winglet to a lower winglet attachment portion of the winglet attach fitting by:

insertably stove-piping or sliding a generally hollow, box-shaped terminal end of the lower winglet attachment portion into a generally hollow interior of the lower winglet at a lower winglet root end, the lower winglet attachment portion oriented at an anhedral angle; and extending at least one fastener through the lower winglet attachment portion and into a lower winglet skin;

removably attaching the wing attachment portion to the wing tip using fasteners to secure the split winglet to the wing, the upper winglet extending upwardly from the wing at the dihedral angle, the lower winglet separate from the upper winglet and extending downwardly from the wing at the anhedral angle;

wherein the lower winglet and the upper winglet are non-articulating when the wing attachment portion is attached to the wing tip;

wherein the upper winglet attachment portion and the lower winglet attachment portion intersect one another at the wing attachment portion; and wherein the upper winglet attachment portion and the lower winglet attachment portion each extend from an outboard side of the wing attachment portion, and in opposing relation to an inboard side of the wing attachment portion.

2. The method of claim 1, wherein using fasteners to secure the split winglet to the wing comprises:
installing the fasteners from an inboard side of the wing tip.

3. The method of claim 2, wherein installing the fasteners from the inboard side of the wing tip comprises:
passing the fasteners into an interior of the wing;
extending the fasteners through a wing tip rib; and
threadably engaging the fasteners into a fitting root end of the wing attachment portion.

4. The method of claim 3, wherein threadably engaging the fasteners into a fitting root end of the wing attachment portion comprises threadably engaging the fasteners to threaded receptacles mounted to the winglet attach fitting.

5. The method of claim 2, wherein the threaded receptacles are barrel nuts.

6. The method of claim 3, wherein passing the fasteners into an interior of the wing comprises passing the fasteners through an opening in a lower wing skin.

7. The method of claim 3, wherein the fitting root end of the wing attachment portion is integrally formed with the wing tip rib.

8. The method of claim 1, wherein removably attaching the wing attachment portion to the wing tip comprises:
fastening the wing attachment portion to a wing tip rib of the wing tip with the upper winglet fastened to the upper winglet attachment portion and the lower winglet fastened to the lower winglet attachment portion.

9. The method of claim 1, further comprising;
removing the fasteners securing the wing attachment portion to the wing tip; and removing the wing attachment portion from the wing tip with at least one of the upper winglet and the lower winglet being attached to the wing attachment portion.

10. The method of claim 1, further comprising:
removing a hinge pin attaching the upper winglet attachment portion to the lower winglet attachment portion, the upper winglet attachment portion being integrally formed with an upper bracket, the lower winglet attachment portion being integrally formed with a lower bracket being a separate component from the upper bracket, the upper bracket and the lower bracket comprising the wing attachment portion;
removing fasteners securing at least one of the upper bracket and the lower bracket to the wing tip; and
removing at least one of the upper winglet and the lower winglet from the wing tip.

11. The method of claim 1, further comprising:
removing a center pin extending through and interconnecting a lug of the upper winglet attachment portion, a lug of the lower winglet attachment portion, and a clevis of the wing attachment portion;
removing a shear pin securing at least one of the upper winglet attachment portion and the lower winglet attachment portion to the clevis; and
removing at least one of the upper winglet and lower winglet from the wing attachment portion.

12. The method of claim 11, further comprising:
placing a lug bearing portion of the lug in bearing contact with a clevis bearing portion of the clevis; and
preventing rotation of at least one of the upper winglet and the lower winglet after removing a center pin.

13. The method of claim 8, further comprising:
removing the lower winglet from the wing attachment portion while the upper winglet is attached to the wing tip.

14. The method of claim 1, wherein each of the steps of extending at least one fastener through the upper winglet attachment portion and into the upper winglet skin, and extending at least one fastener through the lower winglet attachment portion and into the lower winglet skin are performed using shear fasteners.

15. The method of claim 14, wherein the shear fasteners are threadably engaged to threaded receptacles mounted on the upper winglet attachment portion and lower winglet attachment portion.

16. The method of claim 1, wherein removably attaching the wing attachment portion to the wing tip is performed using tension fasteners.

17. The method of claim 1, wherein the wing let attach fitting is formed of metallic material.

18. The method of claim 1, wherein the upper winglet attachment portion and the lower winglet attachment portion are integrally formed with the wing attachment portion.

19. The method of claim 1, wherein at least one of the upper winglet and the lower winglet has one or more winglet spars.

20. The method of claim 19, wherein the upper winglet attachment portion and the lower winglet attachment portion nest against a winglet forward spar and a winglet aft spar respectively of the upper winglet and the lower winglet.

* * * * *